(12) United States Patent
Cao

(10) Patent No.: US 6,744,991 B1
(45) Date of Patent: Jun. 1, 2004

(54) TUNABLE CHROMATIC DISPERSION AND POLARIZATION MODE DISPERSION COMPENSATOR UTILIZING A VIRTUALLY IMAGED PHASED ARRAY

(75) Inventor: Simon X. F. Cao, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/574,542

(22) Filed: May 19, 2000

(51) Int. Cl.⁷ .................................. G02B 6/26
(52) U.S. Cl. ................... 398/147; 398/152; 398/158; 398/159
(58) Field of Search .................... 398/147, 152, 398/158, 159, 79, 81, 88; 385/11; 359/577

(56) References Cited

U.S. PATENT DOCUMENTS

| | | | |
|---|---|---|---|
| 5,930,045 A | 7/1999 | Shirasaki | 359/577 |
| 5,969,865 A | 10/1999 | Shirasaki | 359/577 |
| 5,969,866 A | 10/1999 | Shirasaki | 359/577 |
| 5,973,838 A | 10/1999 | Shirasaki | 359/577 |
| 5,999,320 A | 12/1999 | Shirasaki | 359/577 |
| 6,028,706 A | 2/2000 | Shirasaki et al. | 359/577 |
| 6,330,090 B1 * | 12/2001 | Martin et al. | 398/9 |
| 6,334,014 B1 * | 12/2001 | Nitta et al. | 385/39 |
| 6,337,935 B1 * | 1/2002 | Ford et al. | 385/24 |
| 6,594,054 B1 * | 7/2003 | Dragone | 398/147 |

* cited by examiner

*Primary Examiner*—Leslie Pascal
*Assistant Examiner*—David C. Payne
(74) *Attorney, Agent, or Firm*—Moser Patterson & Sheridan LLP

(57) ABSTRACT

The present invention provides a chromatic dispersion and polarization mode dispersion compensator utilizing a Virtually Imaged Phased Array (VIPA) and birefringent wedges to moderate chromatic dispersion and polarization mode dispersion (PMD). The compensator in accordance with the present invention propagates the composite optical signal in a forward direction; separates the wavelengths in the band of wavelengths in each of the plurality of channels, where the each of the wavelengths in the band is spatially distinguishable from the other wavelengths in the band; spatially separates each wavelength of each band of wavelengths into a plurality of polarized rays; and reflects the plurality of polarized rays toward a return direction, where dispersion is added to the reflected plurality of polarized rays such that the unwanted chromatic dispersion and PMD are compensated. The compensator in accordance with the present invention provides simultaneous tunable compensation of chromatic dispersion and polarization mode dispersion utilizing a single apparatus. A system which utilizes the compensator is thus cost effective to manufacture.

39 Claims, 14 Drawing Sheets

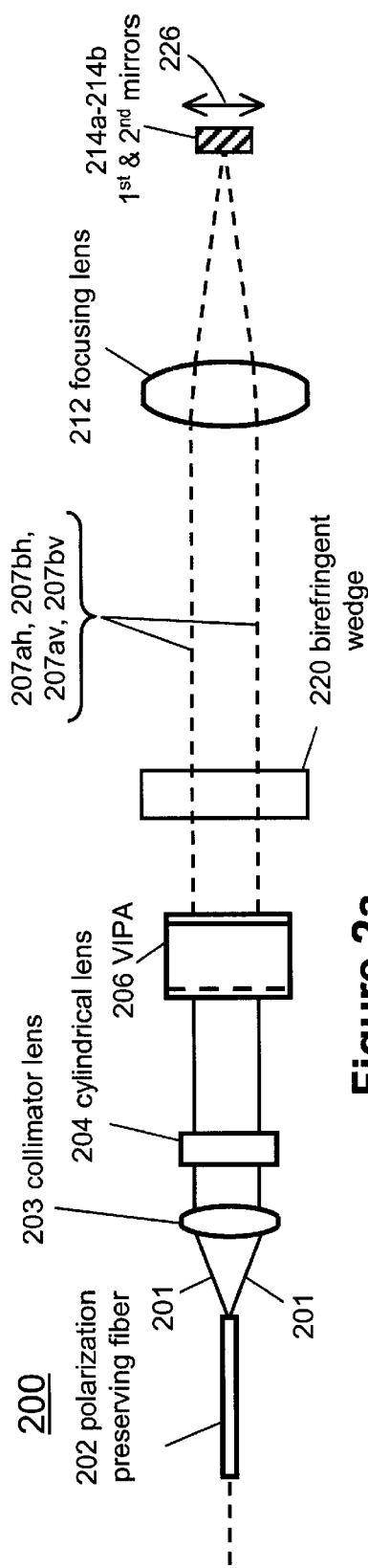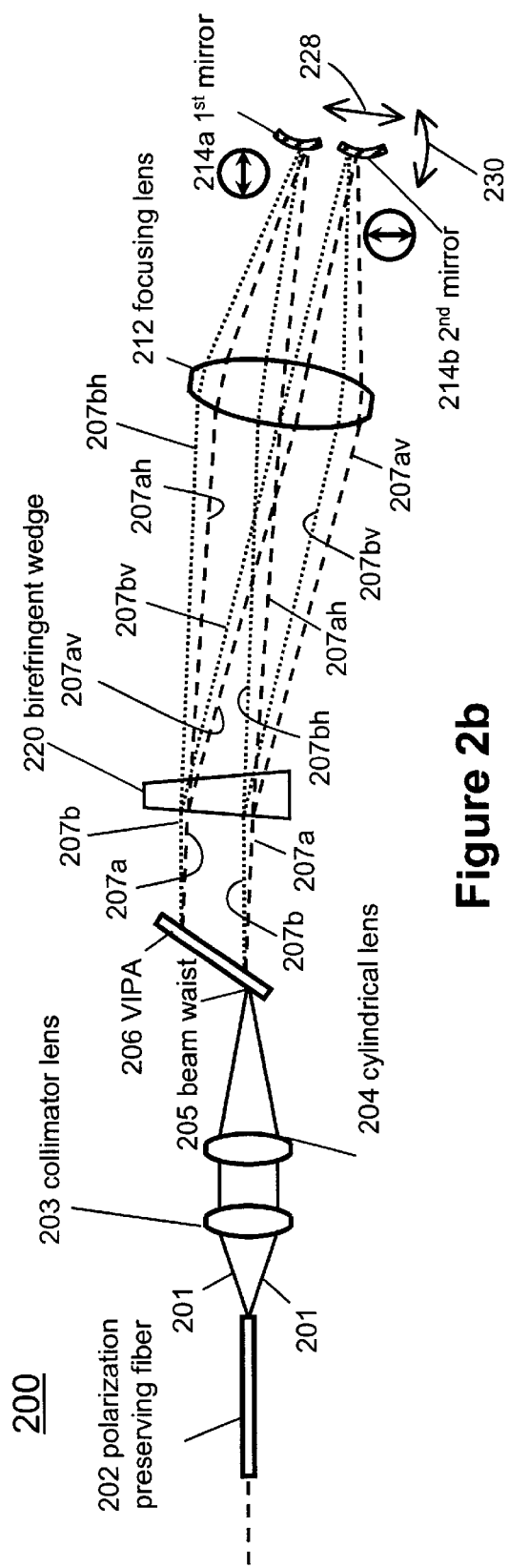

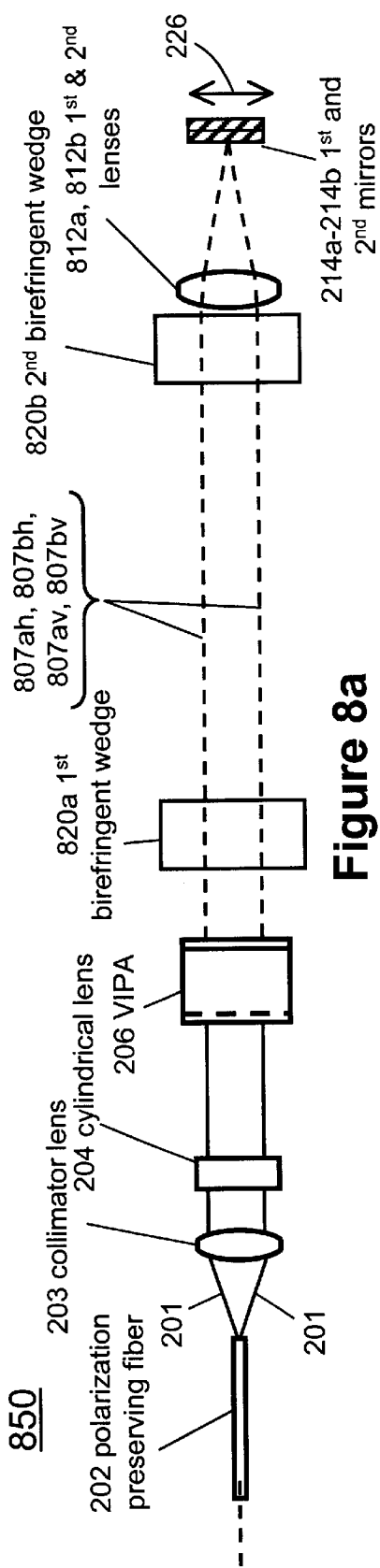
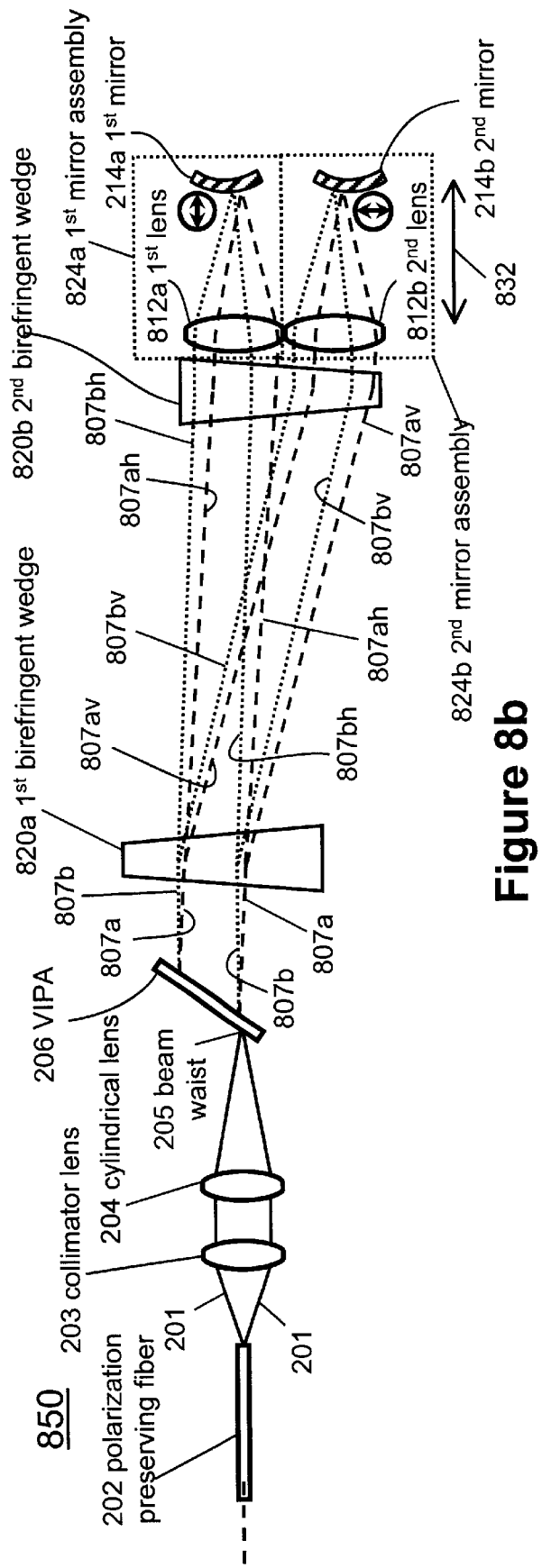
Figure 8a
Figure 8b

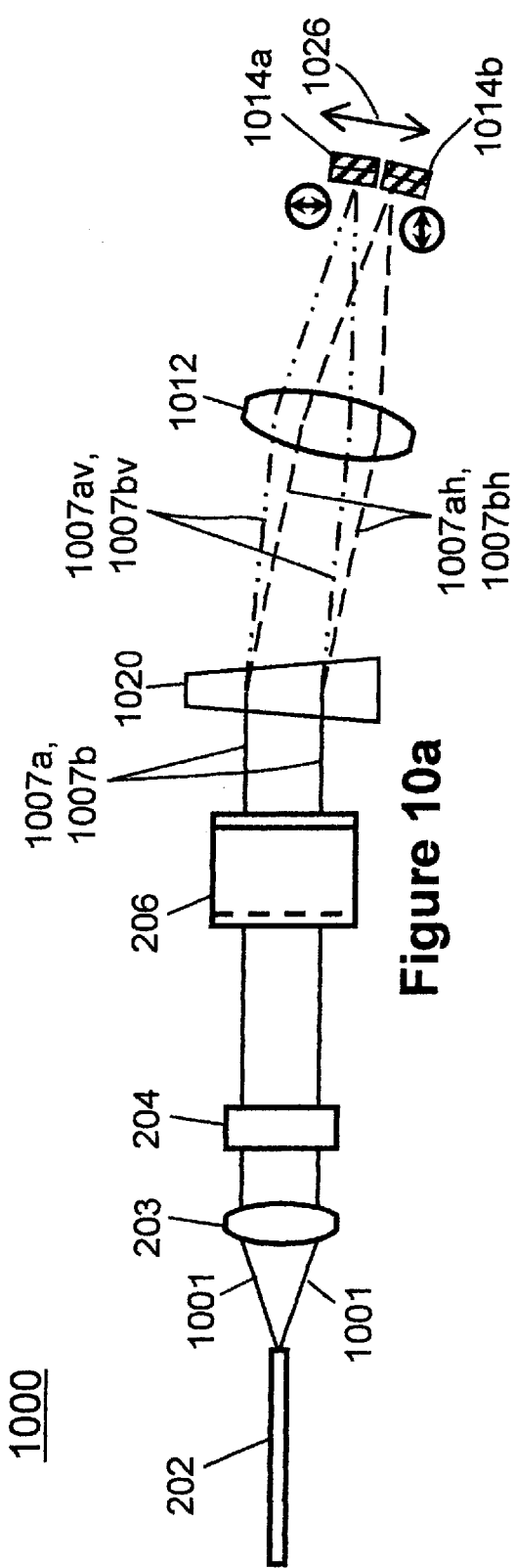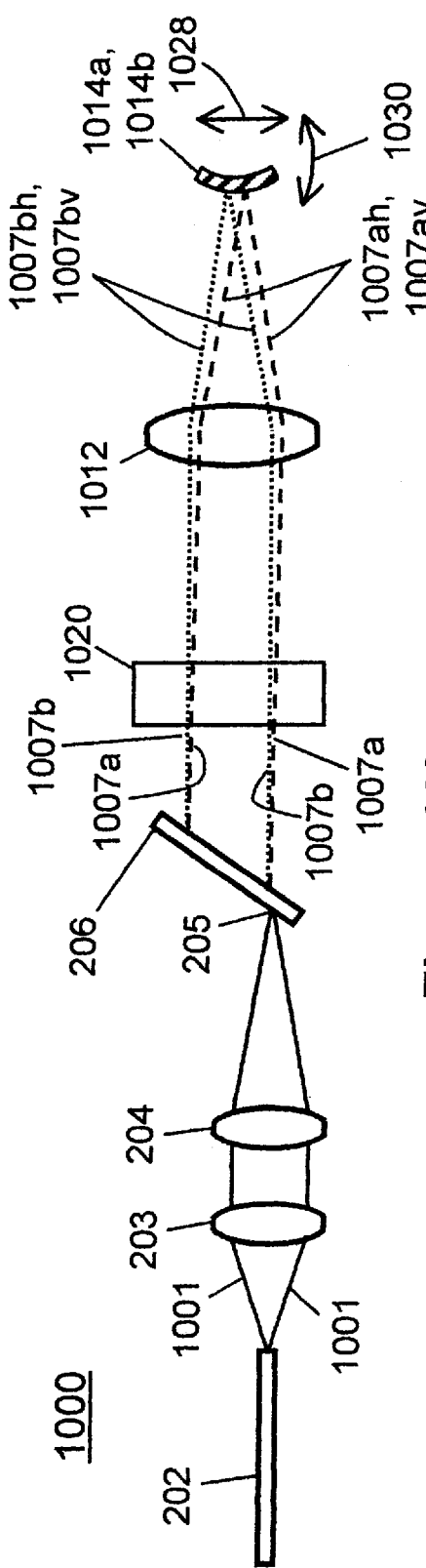

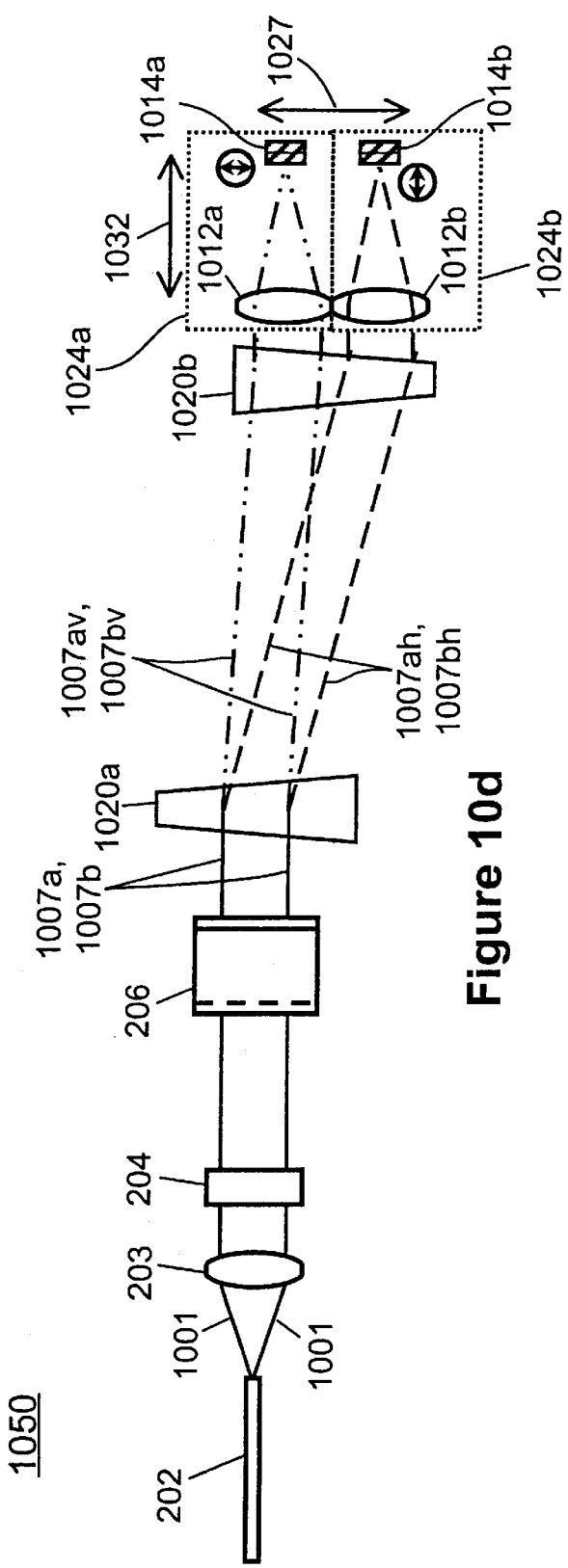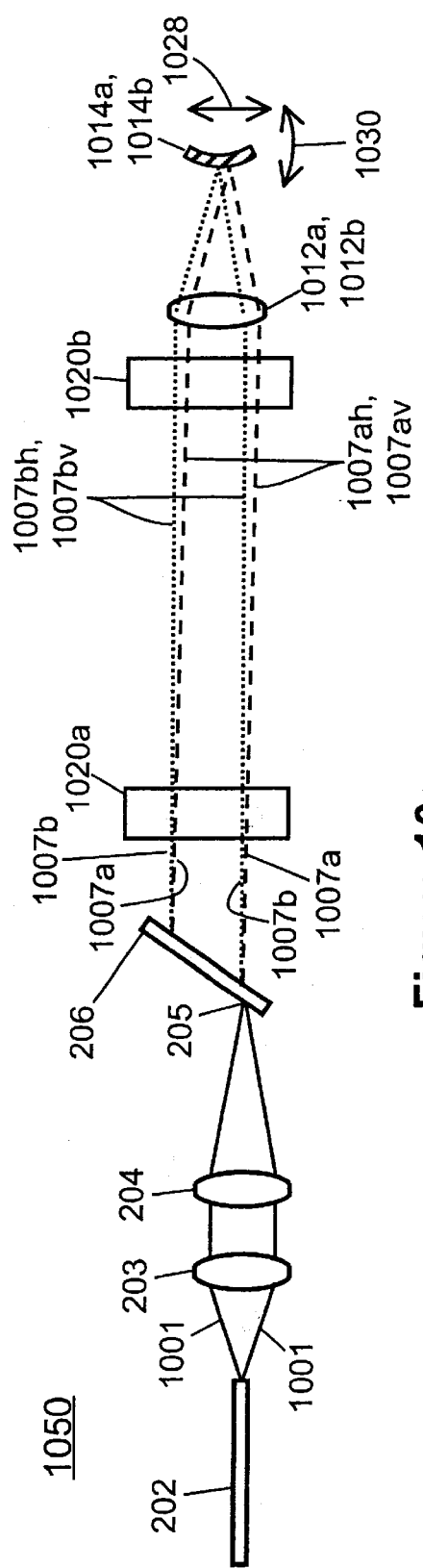
Figure 10d
Figure 10e

TUNABLE CHROMATIC DISPERSION AND POLARIZATION MODE DISPERSION COMPENSATOR UTILIZING A VIRTUALLY IMAGED PHASED ARRAY

FIELD OF THE INVENTION

The present invention relates to chromatic dispersion and polarization mode dispersion compensation, and more particularly to chromatic dispersion and polarization mode dispersion compensation accumulated in a wavelength division multiplexed optical fiber transmission line.

BACKGROUND OF THE INVENTION

Fiber optic networks are becoming increasingly popular for data transmission because of their high speed and high capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this specification, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

One common and well-known problem in the transmission of optical signals is chromatic dispersion of the optical signal. Chromatic dispersion refers to the effect wherein the channels comprising an optical signal travel through an optic fiber at different speeds, e.g., longer wavelengths travel faster than shorter wavelengths. This is a particular problem that becomes more acute for data transmission speeds higher than 2.5 gigabytes per second. The resulting pulses of the signal will be stretched, will possibly overlap, and will cause increased difficulty for optical receivers to distinguish where one pulse begins and another ends. This effect seriously compromises the integrity of the signal. Therefore, for a fiber optic communication system to provide a high transmission capacity, the system must compensate for chromatic dispersion. The exact value of the chromatic dispersion produced in a channel of a wavelength-division multiplexed fiber optic communications system depends upon several factors, including the type of fiber and the wavelength of the channel.

For dense wavelength division multiplexer (DWDM) systems or for WDM or DWDM systems with a wide wavelength spacing between the shortest and longest wavelength channels, the common approach is to allow chromatic dispersion to accumulate within spans of fiber and to compensate for dispersion at the ends of spans through the use of in-line dispersion compensator apparatuses.

A second common and well-known problem in the transmission of optical signals is polarization mode dispersion (PMD). PMD is the phenomenon by which differently polarized components, or sub-signals, comprising an optical signal propagate with different speeds or, alternatively, propagate along differing-length optical paths. This duality of speeds or paths can also cause unacceptable broadening of the digital pulses comprising a signal that increases in severity with increasing transmission speed. The maximum acceptable PMD-induced optical path length difference is the cumulative result of all PMD effects in all the optical elements through which a signal propagates, including fiber and non-fiber optical components. Although the PMD broadening of optical fiber increases as the square root of fiber length, the PMD broadening caused by birefringent components is linearly related to the cumulative optical path difference of all such components.

The chromatic dispersion characteristics of optical fibers are not constant but depend upon wavelength, as illustrated in FIG. 1, which presents graphs of Group Velocity Dispersion, D, against wavelength, for typical examples of three commonly used fiber types. In FIG. 1, the quantity D $(ps-km^{-1}-nm^{-1})$ is defined by the relationship of Eq. 1

$$D = \frac{d}{d\lambda}\left(\frac{1}{v_g}\right) = \frac{1}{L}\left(\frac{d\tau_g}{d\lambda}\right) \qquad (1)$$

in which $\lambda$ is the channel wavelength (nm), $v_g$ is the group velocity (km/ps), $\tau_g$ is the group delay time (ps), and L is the fiber length (km). If $v_g$ decreases with increasing wavelength (i.e., longer or "red" wavelengths travel slower than relatively shorter or "blue" wavelengths) then D is positive, otherwise D is negative. Because all three fiber types illustrated in FIG. 1 are deployed in telecommunications systems, the requirements for dispersion compensators vary widely.

Conventional apparatuses for dispersion compensation include dispersion compensation fiber, chirped fiber Bragg gratings coupled to optical circulators, and conventional diffraction gratings disposed as sequential pairs.

A dispersion compensation fiber, which is used in-line within a fiber communications system, has a special cross-section index profile so as to provide chromatic dispersion that is opposite to that of ordinary fiber within the system. The summation of the two opposite types of dispersion negates the chromatic dispersion of the system. However, dispersion compensation fiber is expensive to manufacture, has a relatively large optical attenuation, and must be relatively long to sufficiently compensate for chromatic dispersion.

A chirped fiber Bragg grating is a special fiber with spatially modulated refractive index that is designed so that longer (shorter) wavelength components are reflected at a farther distance along the chirped fiber Bragg grating than are the shorter (longer) wavelength components. A chirped fiber Bragg grating of this sort is generally coupled to a fiber communications system through an optical circulator. By causing certain wavelength components to travel longer distances than other wavelength components, a controlled delay is added to those components and opposite dispersion can be added to a pulse. However, a chirped fiber Bragg grating has a very narrow bandwidth for reflecting pulses, and therefore cannot provide a wavelength band sufficient to compensate for light including many wavelengths, such as a wavelength division multiplexed light. A number of chirped fiber Bragg gratings may be cascaded for wavelength multiplexed signals, but this results in an expensive system. Furthermore, fiber Bragg gratings generally do not compensate PMD.

A conventional diffraction grating has the property of outputting different wavelengths at different angles. By using a pair of gratings in a coupled spatial arrangement, this property can be used to compensate chromatic dispersion in a fiber communications system. In such a spatial grating pair arrangement, lights of different wavelengths are diffracted from a first grating at different angles. These lights are then input to a second grating that diffracts them a second time so as to set their pathways parallel to one another. Because the different lights travel with different angles between the two gratings, certain wavelength components are made to travel longer distances than other wavelength components. Chromatic dispersion is produced in the spatial grating pair arrangement because the wavelength components that travel the longer distances incur time delays relative to those that travel the shorter distances. This grating-produced chromatic dispersion can be made to be opposite to that of the fiber communications system, thereby compensating the chromatic dispersion within the system. However, a practical spatial grating pair arrangement cannot provide a large enough dispersion to compensate for the relatively large amount of chromatic dispersion occurring in a fiber optic communication system. More specifically, the angular dispersion produced by a diffraction grating is usually extremely small, and is typically approximately 0.05 degrees/nm. Therefore, to compensate for chromatic dispersion occurring in a fiber optic communication system, the two gratings of a spatial grating pair would have to be separated by a very large distance, thereby making such a spatial grating pair arrangement impractical.

Accordingly, there exists a need for an improved chromatic dispersion and polarization mode dispersion compensator. The improved compensator should produce an adjustable chromatic dispersion while simultaneously compensating for polarization mode dispersion. The present invention addresses such a need.

SUMMARY OF THE INVENTION

The present invention provides a chromatic dispersion and polarization mode dispersion compensator utilizing a Virtually Imaged Phased Array (VIPA) and birefringent wedges to moderate chromatic dispersion and polarization mode dispersion (PMD). The compensator in accordance with the present invention propagates the composite optical signal in a forward direction; separates the wavelengths in the band of wavelengths in each of the plurality of channels, where the each of the wavelengths in the band is spatially distinguishable from the other wavelengths in the band; spatially separates each wavelength of each band of wavelengths into a plurality of polarized rays; and reflects the plurality of polarized rays toward a return direction, where dispersion is added to the reflected plurality of polarized rays such that the unwanted chromatic dispersion and PMD are compensated. The compensator in accordance with the present invention provides simultaneous tunable compensation of chromatic dispersion and polarization mode dispersion utilizing a single apparatus. A system which utilizes the compensator is thus cost effective to manufacture.

BRIEF DESCRIPTION OF THE FIGURES

FIGS. 2a and 2b illustrate a top-view and a side-view, respectively, of a first preferred embodiment of a chromatic dispersion and polarization mode dispersion (PMD) compensator in accordance with the present invention.

FIGS. 8a and 8b illustrate a top-view and a side-view, respectively, of a second preferred embodiment of a chromatic dispersion and PMD compensator in accordance with the present invention.

FIGS. 10a and 10b illustrate a top-view and a side-view, respectively, of a third preferred embodiment of the chromatic dispersion and PMD compensator in accordance with the present invention.

FIGS. 10d and 10e illustrates a top-view and a side-view, respectively, of a fourth preferred embodiment of the chromatic dispersion and PMD compensator in accordance with the present invention.

DETAILED DESCRIPTION

Figure 1:
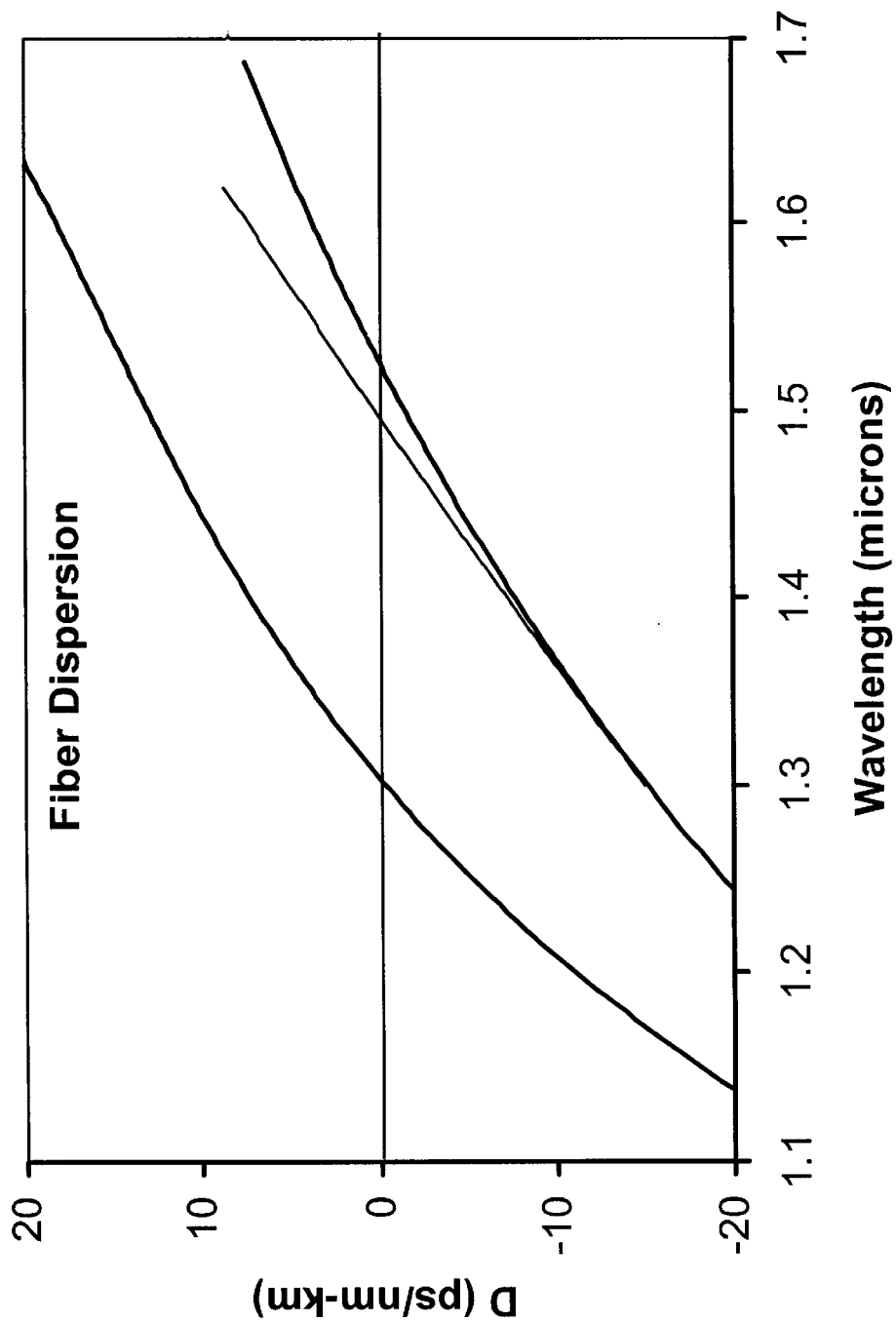
FIG. 1 is a graph of the typical dispersion characteristics of three common commercially available optical fiber types, plotted against wavelength.

The present invention provides an improved chromatic dispersion and polarization mode dispersion (PMD) compensator. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides an apparatus which comprises a virtually imaged phased array (VIPA) optically coupled on a first side to an optical communications system, and optically coupled on a second side to one or more birefringent wedges and a mirror. The VIPA assists in producing chromatic dispersion compensation while the birefringent wedge assists in producing PMD compensation.

FIGS. 2a–2b illustrate a top and side view, respectively, of a first preferred embodiment of a chromatic dispersion and PMD compensator in accordance with the present invention. The compensator 200 comprises a series of optically coupled components, sequentially comprising a polarization preserving fiber 202, a collimator lens 203, a cylindrical lens 204, a VIPA 206, a birefringent wedge 220, a focusing lens 212, and a first and second mirror 214a–214b.

To more particularly describe the functioning of the compensator in accordance with the present invention, please refer to FIGS. 3 through 11 and the discussion below.

Figure 3:
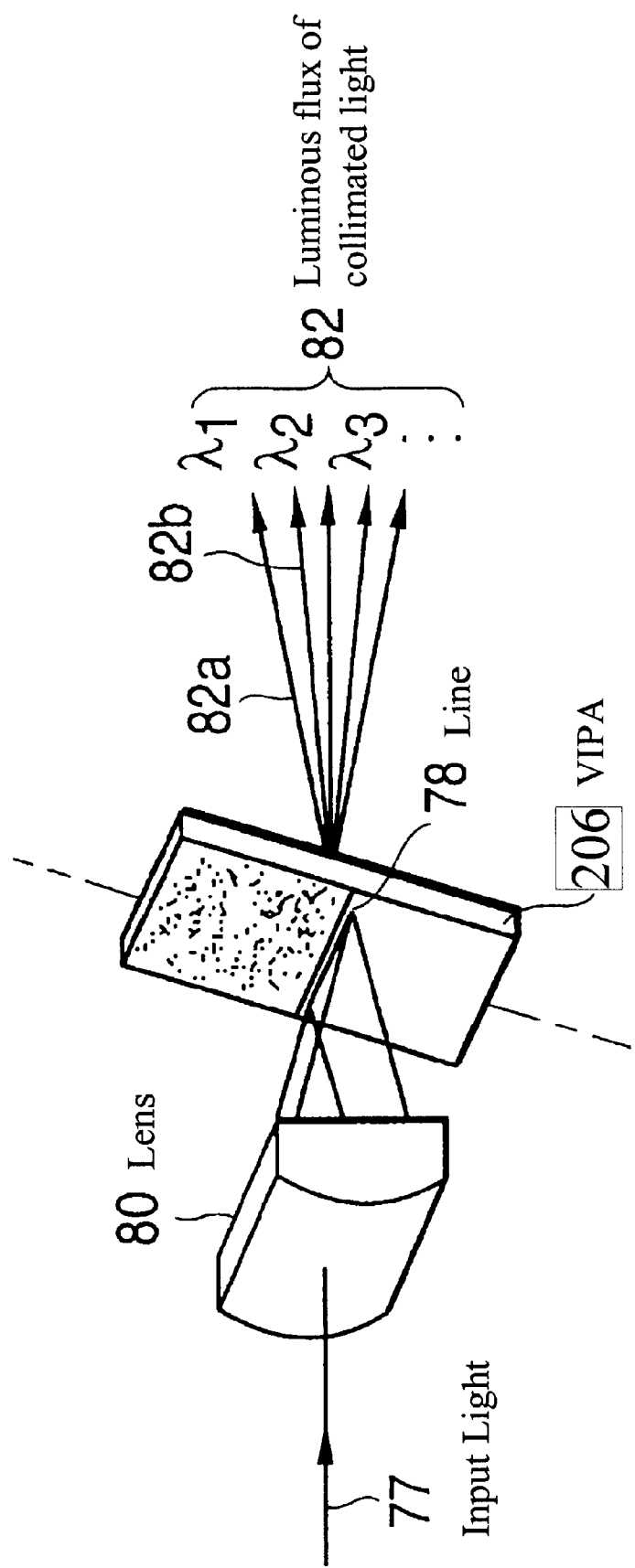
FIG. 3 illustrates a Virtually Imaged Phased Array (VIPA) of the first preferred embodiment of the chromatic dispersion and PMD compensator in accordance with the present invention.

FIG. 3 illustrates a virtually imaged phased array (VIPA) of the first preferred embodiment of the chromatic dispersion and PMD compensator in accordance with the present invention. The VIPA 206 is disclosed in U.S. Pat. No. 5,930,045, incorporated herein by reference. The VIPA 206 is preferably made of a thin plate of glass. An input light 77 is focused into a line 78 with a lens 80, such as a semi-cylindrical lens, so that input light 77 travels into VIPA 206. Line 78 is hereinafter referred to as "focal line". Input light 77 radially propagates from focal line 78 to be received inside VIPA 206. The VIPA 206 then outputs a luminous flux 82 of collimated light, where the output angle of luminous flux 82 varies as the wavelength of input light 77 changes. For example, when input light 77 is at a wavelength $\lambda_1$, VIPA 206 outputs a luminous flux 82a at wavelength $\lambda_1$ in a specific direction. When input light 77 is at a wavelength $\lambda_2$, VIPA 206 outputs a luminous flux 82b at wavelength $\lambda_2$ in a different direction. Therefore, VIPA 206 produces luminous fluxes 82a and 82b that are spatially distinguishable from each other.

Figure 4:
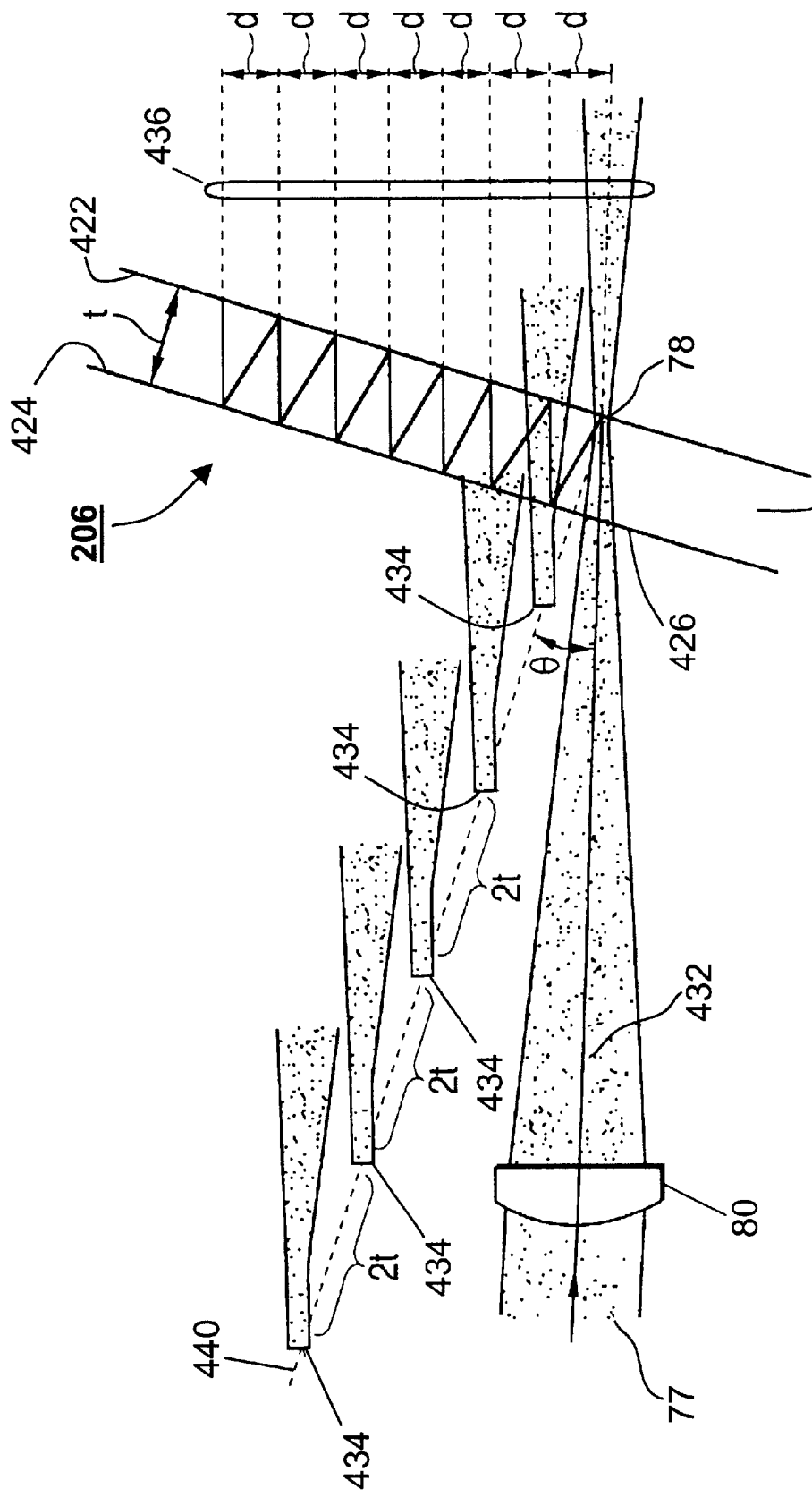
FIG. 4 illustrates in more details the light path through and operation of the VIPA of FIG. 3.

FIG. 4 illustrates in more detail the VIPA 206 and light paths therein and therethrough. The VIPA 206 includes a plate 420 made of, for example, glass, and having reflecting films 422 and 424 thereon. Reflecting film 422 preferably has a reflectance of approximately 95% or higher, but less than 100%. Reflecting film 424 preferably has a reflectance of approximately 100%. A radiation window 426 is formed on plate 420 and preferably has a reflectance of approximately 0% reflectance.

Input light 77 is focused into focal line 78 by lens 80 through radiation window 426, to subsequently undergo multiple reflection between reflecting films 422 and 424. Focal line 78 is preferably on the surface of plate 420 to which reflecting film 422 is applied. Thus, focal line 78 is essentially line focused onto reflecting film 422 through radiation window 426. The width of focal line 78 can be referred to as the "beam waist" of input light 77 as focused by lens 80. Thus, the VIPA 206 focuses the beam waist of input light 77 onto the far surface (that is, the surface having reflecting film 422 thereon) of plate 420. By focusing the beam waist on the far surface of plate 420, the VIPA 206 reduces the possibility of overlap between (i) the area of radiation window 426 on the surface of plate 420 covered by input light 77 as it travels through radiation window 426 and (ii) the area on reflecting film 424 covered by input light 77 when input light 77 is reflected for the first time by reflecting film 424. It is desirable to reduce such overlap to ensure proper operation of the VIPA 206.

In FIG. 4, an optical axis 432 of input light 77 has a small tilt angle θ with respect to a line 440 perpendicular to the plane of plate 420. Upon the first reflection off of reflecting film 422, 5% of the light passes through reflecting film 422 and diverges after the beam waist, and 95% of the light is reflected towards reflecting film 424. After being reflected by reflecting film 424 for the first time, the light again hits reflecting film 422 but is displaced by an amount d. Then, 5% of the light passes through reflecting film 422. In a similar manner, the light is split into many paths with a constant separation d. The beam shape in each path forms so that the light diverges from virtual images 434 of the beam waist. Virtual images 434 are located with constant spacing 2t along a line 440 that is normal to plate 420, where t is the thickness of plate 420. The positions of the beam waists in virtual images 434 are self-aligned, and there is no need to adjust individual positions. The lights diverging from virtual images 434 interfere with one other and form collimated light 436 which propagates in a direction that changes in accordance with the wavelength of input light 77.

The spacing of light paths is d=2t sin θ, and the difference in the path lengths between adjacent beams is 2t cos θ. The angular dispersion of the VIPA 206 is proportional to the ratio of these two numbers, which is cot θ. As a result, a VIPA 206 produces a significantly large angular dispersion.

Reflecting surfaces 422 and 424 are in parallel with each other and spaced by the thickness t of plate 420 and are typically reflecting films deposited on plate 420. As previously described, reflecting surface 424 has a reflectance of approximately 100%, except in radiation window 426, and reflecting surface 422 has a reflectance of approximately 95% or higher. Therefore, reflecting surface 422 has a transmittance of approximately 5% or less so that approximately 5% or less of light incident on reflecting surface 422 will be transmitted therethrough and approximately 95% or more of the light will be reflected. The reflectances of reflecting surfaces 422 and 424 can easily be changed in accordance with the specific VIPA application. However, generally, reflecting surface 422 should have a reflectance which is less than 100% so that a portion of incident light can be transmitted therethrough. This reflectance need not be constant along the reflecting film 422.

The reflecting surface 424 has radiation window 426 thereon. Radiation window 426 allows light to pass therethrough, and preferably has no reflectance, or a very low reflectance. Radiation window 426 receives input light 77 to allow input light 77 to be received between, and reflected between, reflecting surfaces 422 and 424.

A VIPA 206 has strengthening conditions which are characteristics of the design of the VIPA 206. The strengthening conditions increase the interference of the output lights so that a luminous flux is formed. The strengthening conditions of the VIPA are represented by the following equation:

$$2t\cos \Phi = m\lambda$$

in which Φ indicates the propagation direction of the resulting luminous flux as measured from a line perpendicular to the surface of reflecting surfaces 422 and 424, λ indicates the wavelength of the input light, t indicates the distance between the reflecting surfaces 422 and 424, and m indicates an integer. Therefore, if t is constant and m is assigned a specific value, then the propagation direction Φ of the luminous flux formed for input light having wavelength λ can be determined.

More specifically, input light 77 is radially dispersed from focal line 78 through a specific angle. Therefore, input light having the same wavelength will be traveling in many different directions from focal line 78, to be reflected between reflecting surfaces 422 and 424. The strengthening conditions of the VIPA 206 cause light traveling in a specific direction to be strengthened through interference of the output lights to form a luminous flux having a direction corresponding to the wavelength of the input light. Light traveling in a different direction than the specific direction required by the strengthening condition is weakened by the interference of the output lights.

Figure 5:
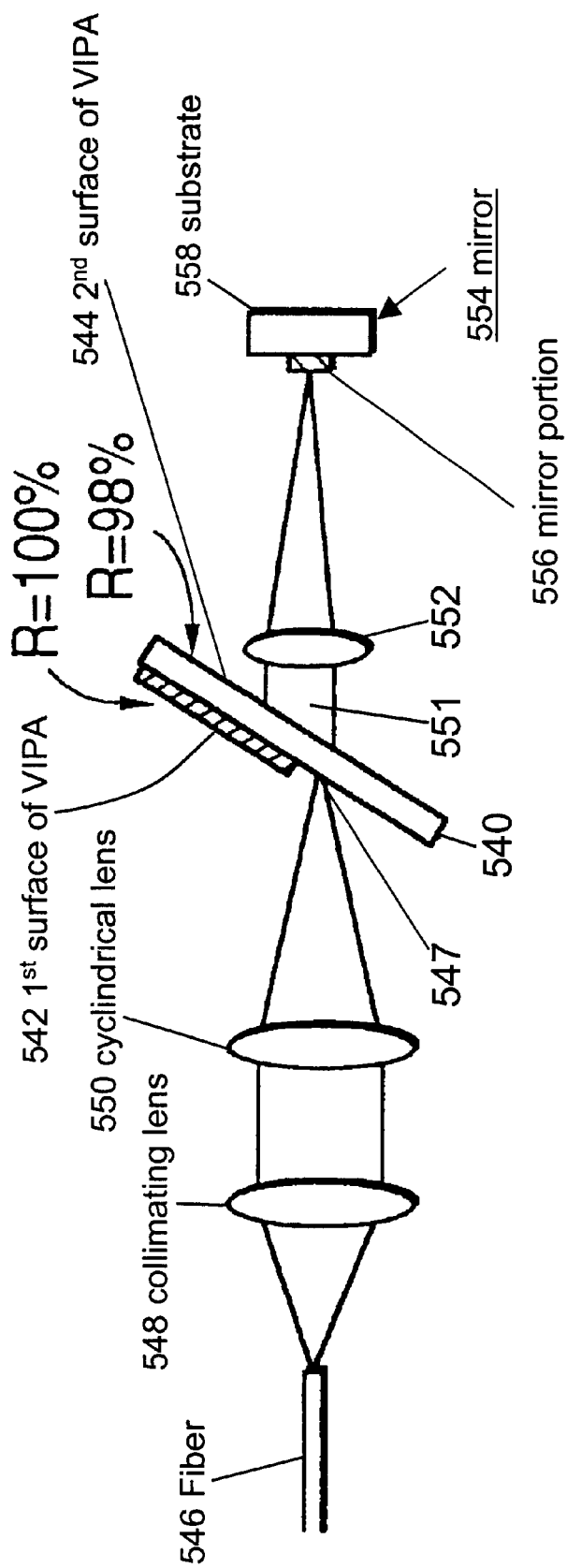
FIG. 5 illustrates an example prior-art apparatus which uses a VIPA and a light returning device to produce chromatic dispersion.

FIG. 5 illustrates an example prior-art apparatus that uses a VIPA as an angular dispersive component to produce chromatic dispersion. A description of this prior-art apparatus will assist in understanding the functioning of the compensator.200. As illustrated in FIG. 5, a light is output from a fiber 546, collimated by a collimating lens 548 and line-focused into VIPA 540 through radiation window 547 by a cylindrical lens 550. The VIPA 540 then produces a collimated light 551 which is focused by a focusing lens 552 onto a mirror 554. Mirror 554 can be a mirror portion 556 formed on a substrate 558. Mirror 554 reflects the light back through focusing lens 552 into VIPA 540. The light then undergoes multiple reflections in VIPA 540 and is output from radiation window 547. The light output from radiation window 547 travels through cylindrical lens 550 and collimating lens 548 and is received by fiber 546.

Therefore, light is output from VIPA 540 and reflected by mirror 554 back into VIPA 540. The light reflected by mirror 554 travels through the path which is nearly exactly opposite in direction to the path through which it originally traveled. As described in greater detail herein following, different wavelength components in the light are focused onto different positions on mirror 554, and are reflected back to VIPA 540. As a result, different wavelength components travel different distances, to thereby produce chromatic dispersion.

Figure 6:
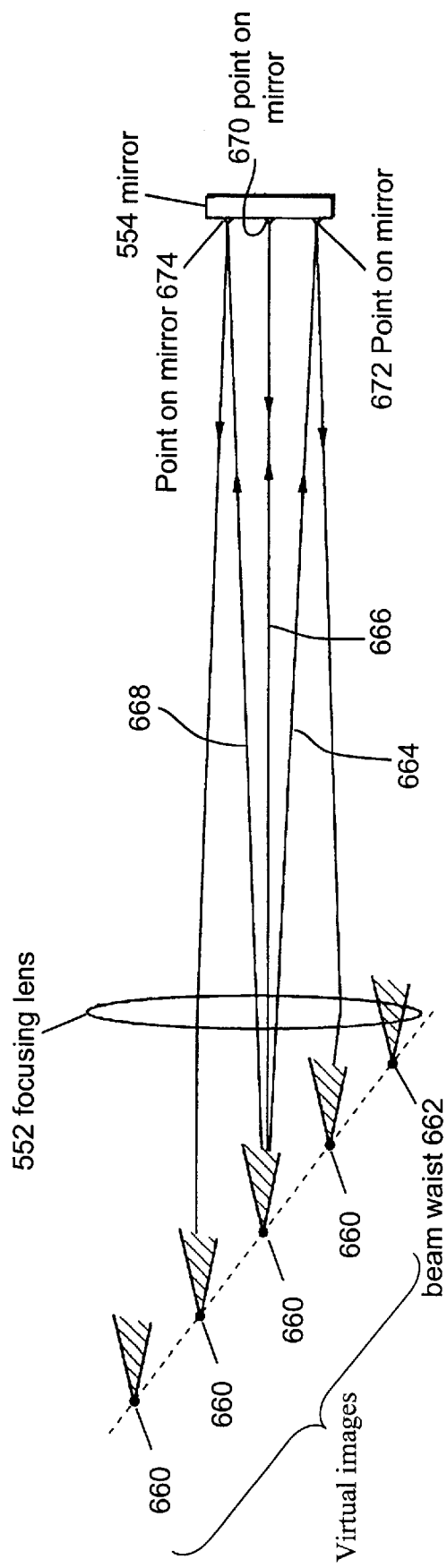
FIG. 6 illustrates in more detail the example apparatus illustrated in FIG. 5.

FIG. 6 illustrates in more detail the example prior-art apparatus illustrated in FIG. 5. Assume a light having various wavelength components is received by VIPA 540. The VIPA 540 will cause the formation of virtual images 660 of beam waist 662, where each virtual image 660 "emits" light. Focusing lens 552 focuses the different wavelength components in a collimated light from VIPA 540 at different points on mirror 554. More specifically, a longer wavelength 664 focuses at point 672, a center wavelength 666 focuses at point 670, and a shorter wavelength 668 focuses at point 674. Then, longer wavelength 664 returns to a virtual image 660 that is closer to beam waist 662, as compared to center wavelength 666. Shorter wavelength 668 returns to a virtual image 660 that is farther from beam waist 662, as compared to center wavelength 666. Thus, the arrangement provides for normal dispersion.

Mirror 554 is designed to reflect only light in a specific interference order, and light in any other interference order should be focused out of mirror 554. More specifically, as previously described, a VIPA 540 will output a collimated light. This collimated light will travel in a direction such that the optical path length difference between subsequent virtual images contributing to the collimated light is $m\lambda$, where m is an integer. The $m^{th}$ order of interference is defined as an output light corresponding to m. Each order comprises a plurality of wavelength components and the wavelength components of one order are repeated in any other order. However, collimated lights at the same wavelength but with different interference orders generally travel in different directions and are therefore focused at different positions. Thus, the mirror 554 can be made to reflect only light from a single interference order back into VIPA 540.

A wavelength division multiplexed light usually includes many channels, wherein each channel has a center wavelength and the center wavelengths are usually spaced apart by a constant frequency spacing. If the thickness t between first and second surfaces 542 and 544 of VIPA 540 is set at a specific value, the arrangement will be able to simultaneously compensate for dispersion in each channel. The thickness t which permits such simultaneous dispersion compensation is such that all of the wavelength components corresponding to the center wavelengths have the same output angle from VIPA 540 and thus the same focusing position on mirror 554. This is possible when the thickness t is set so that, for each channel, the round-trip optical length through VIPA 540 traveled by the wavelength component corresponding to the center wavelength is a multiple of the center wavelength of each channel, that is, t is such that the quantity $2\,nt\cos\theta$ is an integer multiple of the center wavelength of each channel. This amount of thickness t will hereafter be referred to as the "WDM matching free spectral range thickness", or "WDM matching FSR thickness".

Therefore, in FIG. 6, with the thickness t set to the WDM matching FSR thickness, VIPA 540 and focusing lens 552 will cause (a) the wavelength component corresponding to the center wavelength of each channel to be focused at point 670 on mirror 554, (b) the wavelength component corresponding to the longer wavelength component of each channel to be focused at point 672 on mirror 554, and (c) the wavelength component corresponding to the shorter wavelength component of each channel to be focused at point 674 on mirror 554. Therefore, VIPA 540 can be used to compensate for chromatic dispersion in all channels of a wavelength division multiplexed light. However, this prior-art VIPA-based dispersion-compensating apparatus does not compensate for PMD.

Figure 7A:
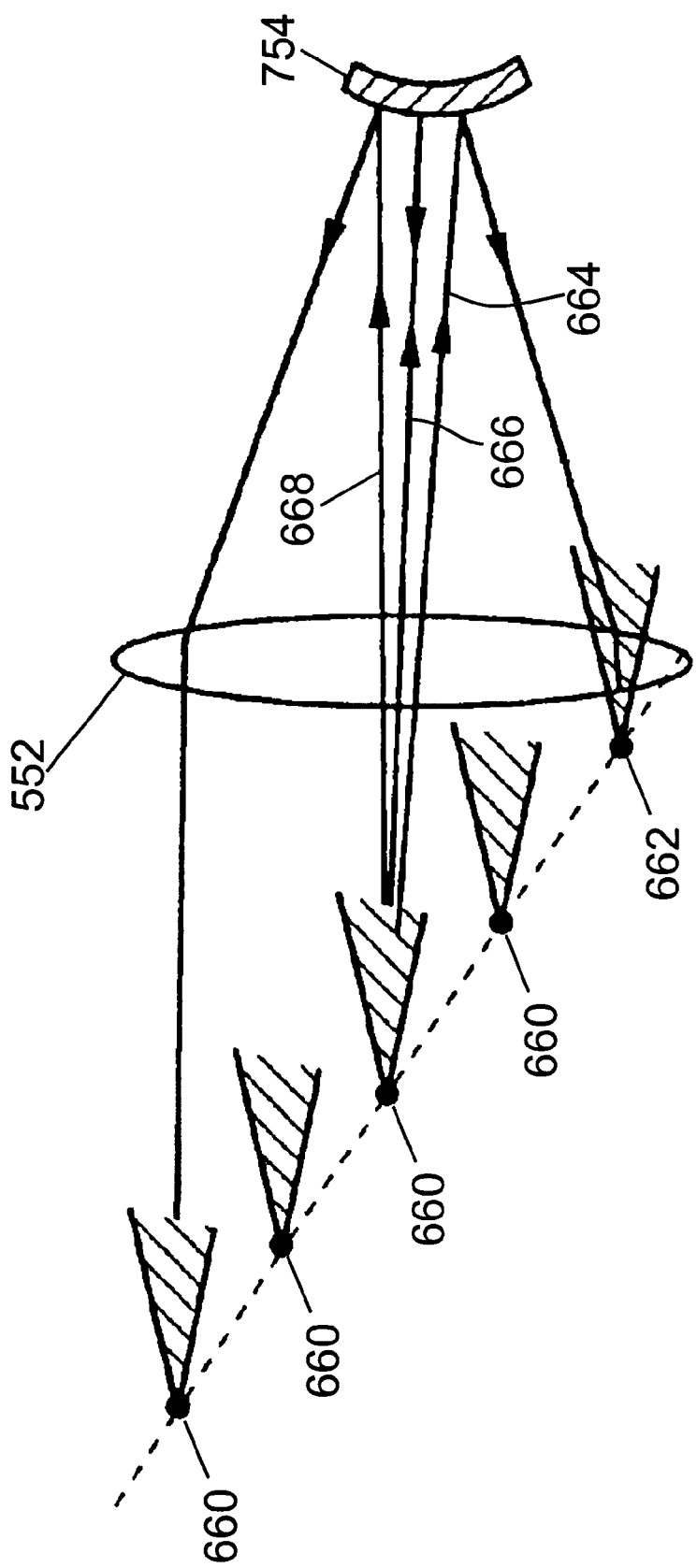
FIGS. 7a and 7b illustrate additional example prior-art apparatuses which use a VIPA to provide chromatic dispersion to light.
Figure 7B:
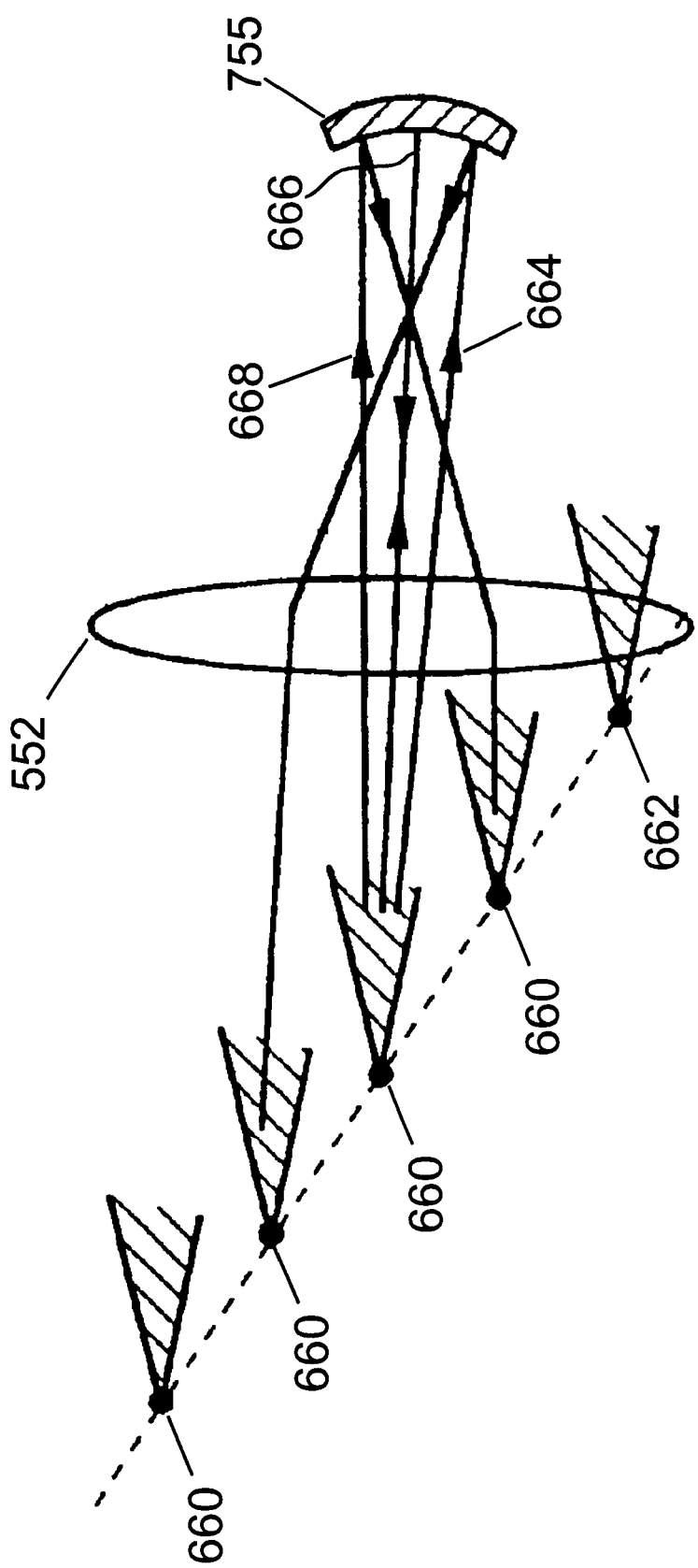

FIGS. 7a and 7b illustrate additional example prior-art apparatuses which use a VIPA to provide various values of chromatic dispersion to light. In FIGS. 7a and 7b, there are illustrated the travel directions of a longer wavelength 664, a center wavelength 666 and a shorter wavelength 668 of light emitted by a virtual image 660 of beam waist 662. The mirror 754 and the mirror 755 are located at or near the focal point of focusing lens 552. In FIG. 7a, mirror 754 is a convex mirror. With a convex mirror, the beam shift is magnified relative to that produced by a flat mirror. Therefore, a large chromatic dispersion can be obtained with a short lens focal length and a small amount of space. In FIG. 7b, mirror 755 is a concave mirror. With a concave mirror, the sign of the dispersion is inverted relative to that produced by a flat mirror.

With either a flat mirror 554 (FIG. 6) or a convex mirror 754 (FIG. 7a), the light of longer ("red") wavelengths of an optical signal travels a shorter round trip distance through the apparatus then does the light of shorter ("blue") wavelengths of the signal. Thus, negative chromatic dispersion is introduced into the signal. This form of apparatus is useful for compensating accumulated positive chromatic dispersion in an optical signal. With a concave mirror 755 (FIG. 7b), the light of "red" wavelengths of an optical signal travels a greater distance through the apparatus then does the light of "blue" wavelengths of the signal and, thus, positive chromatic dispersion is introduced into the signal. This latter form of apparatus is useful for compensating accumulated negative chromatic dispersion in an optical signal.

Returning to FIGS. 2a–2b, a wavelength-division multiplexed composite signal 201 is output from fiber 202, is collimated by collimator lens 203 and is then brought to a line focus at the beam waist 205 of VIPA 206 by the cylindrical lens 204. As discussed previously, the VIPA 206 spatially disperses the wavelengths comprising each one of the channels of composite signal 201, such that rays of each wavelength emanate from the VIPA 206 along ray paths which are parallel to one another but of a different direction than rays of any other wavelength comprising each channel. The thickness of VIPA 206 is equal to the WDM matching FSR thickness previously described.

Disposed to the opposite side of VIPA 206 from cylindrical lens 204 is a birefringent wedge 220. The birefringent wedge 220 divides and physically separates the rays comprising each wavelength of each channel comprising the composite optical signal 201 into a first polarized ray and a second polarized ray, wherein the polarization plane orientations of the first and second polarized rays are mutually orthogonal. This physical separation is illustrated in FIG. 2b by dashed lines and dotted lines for rays comprising relatively longer wavelength 207a and the relatively shorter wavelength 207b, respectively. In the compensator 200, the optic axis and faces of the birefringent wedge 220 are disposed such that the first polarized ray and the second polarized ray of each ray are separated from one another by differential deflection of each of the polarized rays in the vertical dimension. With such a configuration, the less deflected and more greatly deflected rays are generally polarized horizontally and vertically, respectively, as indicated by circles with inscribed double-barbed arrows in FIG. 2b. The relatively longer wavelength 207a of the representative channel of composite optical signal 201 is thus separated into a less deflected, horizontally polarized ray 207ah and a more-greatly-deflected, vertically polarized ray 207av. Likewise, the relatively shorter wavelength 207b is separated into a less deflected, horizontally polarized ray 207bh and a more-greatly-deflected, vertically polarized ray 207bv.

After passing through the birefringent wedge 220, the less deflected polarized rays 207ah and 207bh and the more-greatly-deflected polarized rays 207av and 207bv pass through focusing lens 212 which focuses them onto a first 214a and a second 214b mirror or mirror segment, respectively. The two mirrors or mirror segments 214a–214b are disposed at the focal plane of the lens 212 opposite to the birefringent wedge 220. Although, in the first preferred embodiment, the two mirrors 214a–214b are physically separated from one another, these two mirrors could be configured as two segments or regions of a single mirror. The mirrors or mirror segments may be flat, convex, or concave in cross section, or may assume any one of numerous more-complex shapes. For instance, in FIG. 9, the mirrors or mirror segments 214a–214b are shown as convex cylinders, but need not be limited to this shape or to any other shape. For instance, the mirrors 214a–214b could change continuously from convex to concave, from concave to convex, from concave to flat or from convex to flat from top to bottom or from side to side. There are many other possibilities. For instance, each mirror might comprise a concave portion and a convex portion, etc.

FIGS. 8a–8b illustrate a top and a side view, respectively, of a second preferred embodiment of a chromatic dispersion and PMD compensator in accordance with the present invention. The compensator 850 is constructed similarly to the compensator 200 except that a pair of lenses 812a–812b replaces the single lens 212 of compensator 200 and a pair of birefringent wedges 820a–820b optionally replaces the single birefringent wedge 220 of compensator 200. The first lens 812a and the second lens 812b respectively focus the less deflected rays onto the mirror 214a and the more-greatly-deflected rays onto the mirror 214b. The two lens and mirror systems are thus independent of one another. One of ordinary skill in the art will recognize that the two birefringent wedges 820a–820b may be replaced by a single birefringent plate.

In the compensator 850, the two lenses 812a–812b are disposed sufficiently far from the first (or sole) wedge element such that the set of less deflected rays is completely separated from the set of more-greatly deflected rays upon entry into the lenses 812a–812b. In the second preferred embodiment, the second birefringent wedge 820b is identical to and disposed in an inverted position relative to the first birefringent wedge 820a such that all rays emerge from the second wedge 820b substantially parallel to their propagation directions prior to entering the first birefringent wedge 820a.

Figure 9:
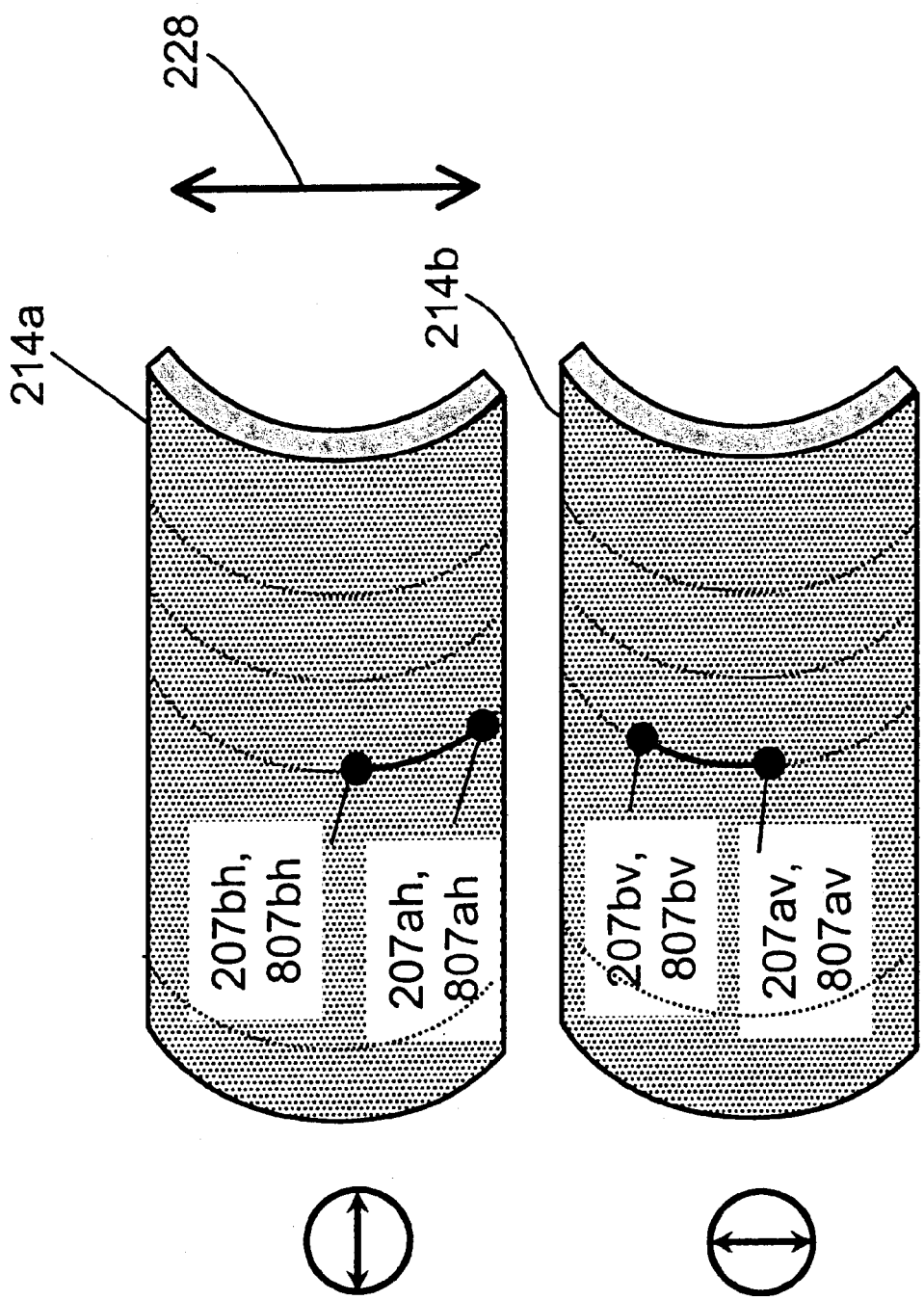
FIG. 9 illustrates a perspective view of the locations of the focused wavelengths of the various channels upon the conical mirror(s) of the embodiments of FIGS. 2a–2b and FIGS. 8a–8b in accordance with the present invention.

FIG. 9 illustrates a perspective view of the locations of the focused wavelengths of the various channels upon the conical mirror(s) of the embodiments of FIGS. 2a–2b and FIGS. 8a–8b in accordance with the present invention. FIG. 9 shows the locations on the mirrors 214a–214b whereupon the rays of the two polarization components of each of the various wavelengths of the composite optical signal 201 are focused in either compensator 200 (FIGS. 2a–2b) or 850 (FIGS. 8a–8b). The relatively longer wavelength rays 207ah, 807ah and 207av, 807av are vertically separated from the relatively shorter wavelength rays 207bh, 807bh and 207bv, 807bv, respectively, within each set of polarized rays. The less deflected, horizontally polarized rays are focused onto upper mirror or mirror segment 214a whilst the more-greatly-deflected vertically polarized rays are focused onto the lower mirror or mirror segment 214b. The vertical separation between rays 207ah, 807ah and 207bh, 807bh on the upper mirror 214a and between rays 207av, 807av and 207bv, 807bv on the lower mirror 214b occurs by virtue of the spatial dispersion of wavelengths by the VIPA 206. The remaining intermediate wavelength rays lie along the lines joining the focal points of rays 207ah, 807ah and 207bh, 807bh and joining the focal points of rays 207av, 807av and 207bv, 807bv, respectively. Further, because the thickness of VIPA 206 satisfies the WSM-matching FSR thickness, the rays comprising the remaining plurality of channels comprising composite optical signal 201 are all focused along these same two lines.

After being reflected by the mirrors or mirror segments 214a–214b, all the rays are returned in the reverse direction through the optical components of either compensator 200 or 850. Thus, in the compensator 200, for instance, the returning diverging rays reflected from their respective focal points at the mirrors 214a–214b are collimated by the lens 212, are re-combined into channels by birefringent wedge 220 and are returned to VIPA 206. Within the VIPA 206, the returning channels receive compensatory dispersion depending upon the curvature and angle of the portions of the mirrors from which they were reflected. The dispersion compensated channels are then output from VIPA 206 at the beam waist 205, are collimated by cylindrical lens 204 and are finally focused into the end face of polarization preserving fiber 202 by the collimator lens 203.

The mirrors 214a–214b may be either flat, cylindrical concave, cylindrical convex, or of some combination of these basic shapes. However, in plan view (FIGS. 2a, 8a), the mirrors 214a–214b are disposed at right angles to the main axis, wherein the main axis is parallel to fiber 202. Therefore, all returning rays are parallel to the projection of the main axis in plan view. In side view (FIGS. 2b, 8b), however, the returning rays do not exactly re-trace their respective paths but are instead reflected so as to have differing vertical components. The pathways of the returning rays, as observed in side view, depend upon the particular orientation of the respective mirror surface region from which they were reflected. These differing pathways cause the returning rays to be directed towards different virtual images of the beam waist of VIPA 206 so as to introduce dispersion, as described previously.

Additionally, the compensation of PMD is accomplished by virtue of the fact that, as shown in FIG. 9, the mirrors 214a–214b are disposed such that the horizontally polarized and vertically polarized rays reflect from different "levels" or surface orientations of the upper mirror or mirror segment 214a and lower mirror or mirror segment 214b, respectively. Therefore, the returning horizontally polarized and returning vertically polarized rays propagate along slightly different angles from the horizontal. These different propagation directions cause the returning horizontally polarized and vertically polarized rays to be directed towards different virtual images of the beam waist of VIPA 206 so as to introduce compensatory polarization dispersion.

Within either compensator 200 or compensator 850, the degree of polarization dispersion introduced into the channels may be controlled or "tuned" by transversely displacing one of the mirrors 214a–214b along the adjustment directions 228 (FIGS. 2a–8a) or by rotating one of the mirrors 214a–214b about a horizontal line perpendicular to the main axis according to rotational adjustment 230 (FIG. 2b). Additionally, in the compensator 850, the degree of introduced polarization dispersion may be controlled by translating one of the lens/mirror assemblies 824a–824b as a unit parallel to the adjustment direction 832. This latter type of adjustment introduces dispersion by creating a simple physical path-length difference between the two sets of polarized rays. Also, in either the compensator 200 or the compensator 850, if the curvature, in vertical cross sections, of the mirrors 214a–214b varies from side to side, then chromatic dispersion may be adjusted by lateral adjustment of both mirrors in concert according to adjustment direction 226.

FIGS. 10a–10b illustrate a top side and a side view, respectively, of a third preferred embodiment of a chromatic dispersion and PMD compensator in accordance with the present invention. In the dispersion compensator 1000, the disposition and functioning of the polarization preserving fiber 202, collimator lens 203, cylindrical focussing lens 204 and VIPA 206 with beam waist 205 are similar to their respective dispositions and functioning within the compensators 200 and 850. The detailed operation of these components is thus not repeated further except to note that an input composite optical signal 1001 emerges from and is spatially dispersed by VIPA 206 such that each of the wavelengths comprising each of the plurality of channels propagates in a different direction from the remaining wavelengths comprising the respective channel. The dispersion plane of VIPA 206 is vertical such that, as shown in FIG. 10b, the relatively longer wavelength 1007a of a representative channel propagates with a different vertical component than that of the relatively shorter wavelength 1007b of the channel.

The compensator 1000 further comprises a birefringent wedge 1020, a lens 1012 and two mirrors or mirror segments 1014a–1014b as shown in FIGS. 10a–10b. The birefringent wedge 1020 divides and physically separates the rays comprising each wavelength of each channel comprising the composite optical signal 1001 into a first polarized ray and a second polarized ray, wherein the polarization plane orientations of the first and second polarized rays are mutually orthogonal. In the compensator 1000, the optic axis and faces of the birefringent wedge birefringent wedge 1020 are disposed such that the division and separation of each wavelength propagating therethrough takes place within a horizontal plane, as shown in the top view, FIG. 10a. The resulting less deflected and more greatly deflected rays are generally polarized vertically and horizontally, respectively, as indicated by circles with inscribed double-barbed arrows in FIG. 10a. The relatively longer wavelength 1007a of the representative channel of composite optical signal 1001 is thus separated into a less deflected, vertically polarized ray 1007av and a more-greatly-deflected, horizontally polarized ray 1007ah. Likewise, the relatively shorter wavelength 1007b is separated into a less deflected, vertically polarized ray 1007bv and a more-greatly-deflected, horizontally polarized ray 1007bh.

After passing through the birefringent wedge 1020, the less deflected polarized rays 1007av and 1007bv and the more-greatly-deflected polarized rays 1007ah and 1007bh comprising each channel pass through focusing lens 1012 which focuses them onto a first 1014a and a second 1014b mirrors or mirror segment, respectively. The two mirrors 1014a–1014b are disposed at the focal plane of the lens 1012 opposite to the birefringent wedge 1020. Although, in the preferred embodiment shown in FIGS. 10a–10b, the two mirrors 1014a–1014b are physically separated from one another, these two mirrors could be configured as two segments or regions of a single mirror.

Figure 10C:
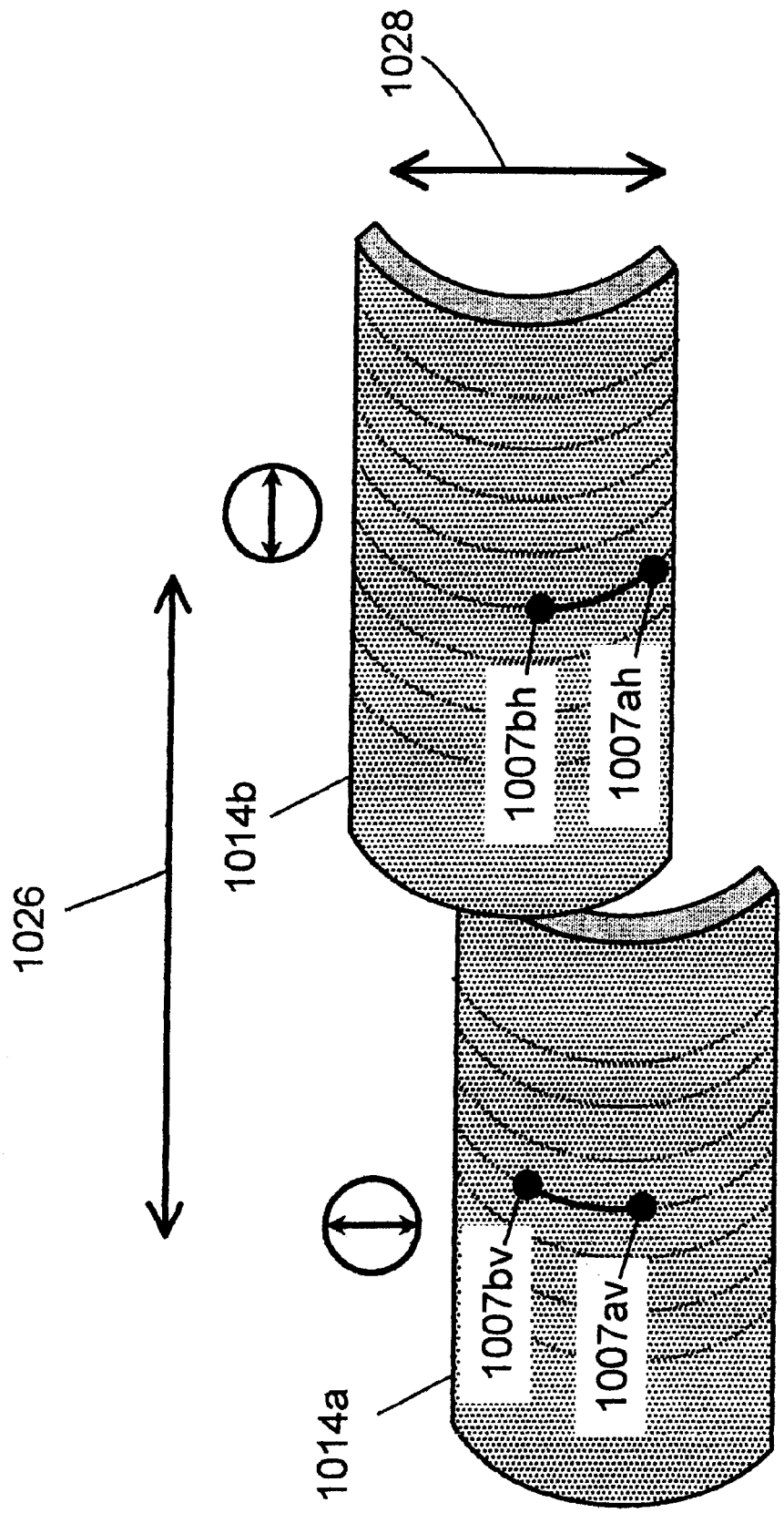
FIG. 10c illustrates a perspective view of the locations of the focused wavelengths of the various channels upon the mirrors of the embodiment of FIGS. 10a–10b in accordance with the present invention.

FIG. 10c shows the locations on the curved mirrors 1014a–1014b whereupon the rays of the two polarization components of each of the various wavelengths of the composite optical signal 1001 are focused in compensator 1000. The relatively longer wavelength rays 1007av and 1007ah are vertically separated from the relatively shorter wavelength rays 1007bv and 1007bh, respectively, within each set of polarized rays. The less deflected, vertically polarized rays are focused onto first mirror or mirror segment 1014a whilst the more-greatly-deflected horizontally polarized rays are focused onto the second mirror or mirror segment 1014b. The vertical separation between rays 1007av and 1007bv on the first mirror 1014a and between rays 1007ah and 1007bh on the second mirror 1014b occurs by virtue of the spatial dispersion of wavelengths by the VIPA 206. The remaining intermediate wavelength rays lie along the lines joining the focal points of rays 1007av and 1007bv and joining the focal points of rays 1007ah and 1007bh, respectively. Further, because the thickness of VIPA 206 satisfies the WDM-matching FSR thickness condition, the rays comprising the remaining plurality of channels comprising composite optical signal 1001 are all focused along these same two lines.

The mirrors or mirror segments 1014a–1014b may be flat, convex, or concave in cross section, or may assume any one of numerous more-complex shapes. For instance, in FIG. 10c, the mirrors or mirror segments 1014a–1014b are shown as convex cylinders, but need not be limited to this shape or to any other shape. For instance, the mirrors 1014a–1014b could change continuously from convex to concave, from concave to convex, from concave to flat or from convex to flat from top to bottom or from side to side. There are many other possibilities. For instance, each mirror might comprise a concave portion and a convex portion, etc.

After being reflected by the mirrors or mirror segments 1014a–1014b, all the rays are returned in the reverse direction through the optical components of the compensator 1000. Thus, in the compensator 1000, the returning diverging rays reflected from their respective focal points at the mirrors 1014a–1014b are collimated by the lens 1012, are re-combined into channels by birefringent wedge 1020 and are returned to VIPA 206. Within the VIPA 206, the returning channels receive compensatory dispersion depending upon the curvature and angle of the portions of the mirrors from which they were reflected. The dispersion compensated channels are then output from VIPA 206 at the beam waist 205, are collimated by cylindrical lens 204 and are finally focused into the end face of polarization preserving fiber 202 by the collimator lens 203.

The mirrors 1014a–1014b may be either flat, cylindrical concave, cylindrical convex, or of some combination of these basic shapes. In plan view (FIG. 10a), the mirrors 1014a–1014b are disposed such that the reflected rays, after being collimated by lens 1012, propagate exactly opposite, in plan view, to their respective directions just prior to passing through the lens 1012 in the forward direction. In side view (FIG. 10b), however, the returning rays do not exactly re-trace their respective paths but are instead reflected so as to have differing vertical directional components. The pathways of the returning rays, as observed in side view (FIG. 10b), depend upon the particular orientation of the respective mirror surface region from which they were reflected (FIG. 10c). These differing vertical directional components cause the returning rays to be directed towards different virtual images of the beam waist of VIPA 206 so as to introduce dispersion, as described previously.

Additionally, the compensation of PMD is accomplished by virtue of the fact that, as shown in FIG. 10c, the mirrors 1014a–1014b are disposed such that the vertically polarized and horizontally polarized rays reflect from different "levels" or surface orientations of the first mirror 1014a and second mirror 1014b, respectively. Therefore, the reflected returning vertically polarized and returning horizontally polarized rays propagate along slightly different angles from the horizontal. These different propagation directions cause the returning horizontally polarized and vertically polarized rays to be directed towards different virtual images of the beam waist of VIPA 206 so as to introduce dispersion so as to compensate for original PMD in the original composite optical signal 1001.

Within the compensator 1000, the degree of polarization dispersion introduced into the channels may be controlled or "tuned" by transversely displacing one of the mirrors 1014a–1014b along the adjustment direction 1028 (FIGS. 10b, 10c) or by rotating one of the mirrors 1014a–1014b about a horizontal line according to rotational adjustment direction 1030 (FIG. 10b). Further, if the curvature, in vertical cross sections, of the mirrors 1014a–1014b varies from side to side, then chromatic dispersion may be adjusted by lateral adjustment of both mirrors in concert according to adjustment direction 1026 (FIGS. 10a, 10c).

FIGS. 10d–10e illustrate a top view and a side view, respectively, of a fourth preferred embodiment of a chromatic dispersion and PMD compensator in accordance with the present invention. The compensator 1050 is similar in construction and operation to the compensator 1000 except that the single birefringent wedge 1020 and the single focusing lens 1012 of compensator 1000 are respectively replaced by the two birefringent wedges 1020a–1020b and the two focusing lenses 1012a–1012b in the compensator 1050. One of ordinary skill in the art will readily recognize that the two birefringent wedges 1020a–1020b may be replaced by a single birefringent plate. The configuration of elements in the compensator 1050 permits each lens/mirror assembly 1024a–1024b to be adjusted independently of the other along adjustment direction 1032. This adjustment along the adjustment direction 1032 (FIG. 10d) provides an additional means of compensating PMD by causing a difference between the physical path lengths of vertically polarized rays 1007av, 1007bv and of horizontally polarized rays 1007ah, 1007bh. PMD compensation may also be varied in the compensator 1050 by adjusting one or more of the mirrors 1014a–1014b according to adjustment direction 1028 or 1030 (FIG. 10e). Chromatic dispersion compensation may be varied in compensator 1050 by simultaneously adjusting both mirrors 1014a–1014b along adjustment direction 1027 (FIG. 10d).

Figure 11:
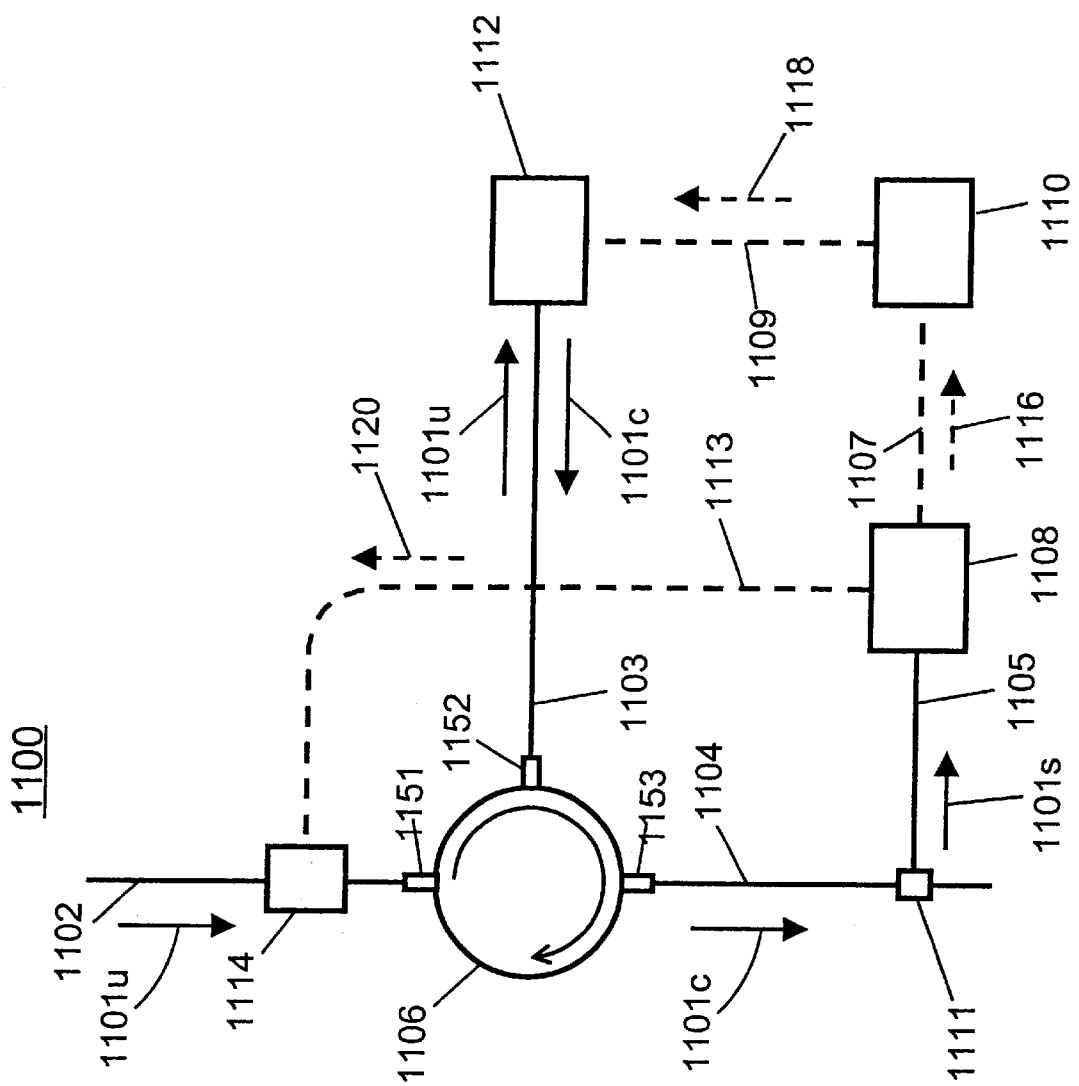
FIG. 11 illustrates a preferred embodiment of an optical communications system utilizing the chromatic dispersion and PMD compensator in accordance with the present invention.

FIG. 11 illustrates a preferred embodiment of an optical communications system utilizing the chromatic dispersion and PMD compensator in accordance with the present invention. The system 1100 comprises an input fiber optic line 1102, an optical tap 1111, a dispersion analyzer 1108, a compensator controller 1110, a dispersion compensator 1112, a polarization controller 1114, an optical circulator 1106 and an output fiber optic line 1104. The input line 1102 and output line 1104 are optically coupled to the port 1151 and to the port 1153 of circulator 1106, respectively. The system further comprises a fiber optic tap line 1105 optically coupling the optical tap 1111 to the dispersion analyzer 1108 and a fiber optic line 1103 optically coupling the dispersion compensator 1112 to port 1152 of the circulator 1106. The system further comprises first 1107 and second 1109 electronic signal or control lines respectively connected between the dispersion analyzer 1108 and the controller 1110 and between the controller 1110 and the dispersion compensator 1112. The system further comprises a third electronic signal or control line 1113 connected between the dispersion analyzer 1108 and the polarization controller 1114. The polarization controller 1114 may be one of several well-known types, such as a looped fiber device, an optical wave plate device, or an electronic liquid crystal device. The polarization controller 1114 serves to convert or rotate the polarization state of incoming uncompensated signal light into a polarization state compatible with the birefringent elements of the compensator 1112 so as to provide optimal PMD compensation. The fiber optic line 1103 preferably comprises a polarization-preserving fiber.

An uncompensated optical signal or composite optical signal 1101u is input to the system 1100 via the input fiber optic line 1102. The uncompensated signal 1101u comprises unwanted chromatic dispersion and PMD that is to be compensated by the system 1100. The uncompensated optical signal or composite signal 1101u passes through the polarization controller 1114 to the port 1151 of the optical circulator 1106. The optical circulator directs signal 1101u to its port 1152, from which it is immediately output to the fiber optic line 1103 and input to the dispersion compensator 1112.

As described previously herein, the dispersion compensator 1112 provides compensatory chromatic dispersion and PMD to the uncompensated optical signal or composite optical signal 1101u so as to output the compensated signal or composite optical signal 1101c. The compensated signal 1101c is output along the optical fiber line 1103 in the opposite direction from the input signal 1101u. The compensated signal is then input to optical circulator 1106 through its port 1152. By the well-known operation of optical circulators, the compensated signal 1101c is directed to the port 1153 of optical circulator 1106, from which it is immediately output to the output fiber optic line 1104. A small portion 1101s of the compensated output signal 1101c is split off from signal 1101c by the optical tap 1111 and diverted to the dispersion analyzer 1108 via the fiber optic tap line 1105.

The dispersion compensator 1112 is controlled by electronic signal 1118 output from controller 1110 along electronic line 1109. The controller 1110 generates control signals in response to an electronic signal or signals 1116 produced by dispersion analyzer 1108 and sent to the controller 1110 along electronic line 1107. The dispersion analyzer 1108 may comprise separate known components to analyze chromatic dispersion and PMD, such as an optical spectrum analyzer and an ellipsometer, respectively. The electronic signal(s) 1116 contains information measured by the dispersion analyzer 1108 and pertaining to the magnitude of chromatic dispersion and PMD carried by the sample signal 1101s. By logical extension, these quantities also relate to the signal 1101u. In response to these measurements, the dispersion analyzer 1108 outputs a first electronic signal 1116 to controller 1110 along electronic line 1107 and, optionally, outputs a second electronic signal 1120 to the polarization controller 1114 along electronic line 1113.

The amount of compensatory dispersion provided by dispersion compensator 1112 is controlled by the electronic signal 1118 output from the controller 1110 in response to the dispersion characteristics measured by dispersion analyzer 1108. One or more of the various optical components in the dispersion compensator 1112 may be adjusted along its respective adjustment direction, as described previously herein, thereby causing variation in the magnitude of the compensatory dispersion. The polarization components of the uncompensated signal 1101u may be separated and or rotated prior to input to the dispersion compensator 1112. The polarization controller 1114 performs these polarization separation and rotation functions.

A chromatic dispersion and polarization mode dispersion compensator utilizing a Virtually Imaged Phased Array (VIPA) and birefringent wedges to moderate chromatic dispersion and polarization mode dispersion has been disclosed. The compensator in accordance with the present invention provides simultaneous tunable compensation of chromatic dispersion and polarization mode dispersion utilizing a single apparatus. A system which utilizes the compensator is thus cost effective to manufacture.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for dispersion compensation for a composite optical signal in an optical fiber transmission system, the composite optical signal comprising a plurality of channels, each of the plurality of channels comprising a band of wavelengths, wherein the bands of wavelengths comprises unwanted chromatic dispersion and polarization mode dispersion (PMD), comprising the steps of:
   (a) propagating the composite optical signal in a forward direction;
   (b) separating the wavelengths in the band of wavelengths in each of the plurality of channels, wherein each of the wavelengths in the band is spatially distinguishable from the other wavelengths in the band utilizing a Virtually Imaged Phase Array (VIPA);
   (c) spatially separating each wavelength of each band of wavelengths into a plurality of polarized rays; and
   (d) reflecting the plurality of polarized rays toward a return direction, wherein dispersion is added to the reflected plurality of polarized rays such that the unwanted chromatic dispersion and PMD are compensated.

2. The method of claim 1, wherein the spatially separating step (c) comprises:
   (c1) spatially separating each wavelength of each band of wavelengths into a first polarized ray and a second polarized ray utilizing the VIPA, wherein a polarization plane orientation of the first and second polarized rays are mutually orthogonal.

3. The method of claim 1, wherein in the reflecting step (d), each of the plurality of polarized rays intercepts at least one mirror at a different position.

4. The method of claim 3, wherein a first polarized ray intercepts a first mirror and a second polarized ray intercepts a second mirror.

5. A dispersion compensator, comprising:
   a Virtually Imaged Phased Array (VIPA) optically coupled to an optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and PMD;
   at least one birefringent wedge, wherein a first side of the at least one birefringent wedge is optically coupled to a second side of the VIPA;
   at least one focusing lens, wherein a first side of the at least one focusing lens is optically coupled to a second side of the at least one birefringent wedge; and
   at least one mirror optically coupled to a second side of the at least one focusing lens, wherein the at least one mirror reflects a plurality of polarized rays of each of the bands of wavelengths toward a return direction, wherein dispersion is added to the reflected plurality of polarized rays such that the unwanted chromatic dispersion and PMD are compensated.

6. The compensator of claim 5, wherein the VIPA separates the wavelengths in a band of wavelengths in each of a plurality of channels, wherein each of the wavelengths in the band is spatially distinguishable from the other wavelengths in the band.

7. The compensator of claim 5, wherein the at least one birefringent wedge spatially separates each wavelength of each band of wavelengths traversing through the at least one birefringent wedge in the forward direction into the plurality of polarized rays.

8. The compensator of claim 7, wherein each wavelength is separated into the plurality of polarized rays within a vertical plane.

9. The compensator of claim 7, wherein each wavelength is separated into the plurality of polarized rays within a horizontal plane.

10. The compensator of claim 5, wherein the at least one birefringent wedge comprises:
    a first birefringent wedge, wherein a first side of the first birefringent wedge is optically coupled to the second side of the VIPA; and
    a second birefringent wedge, wherein a first side of the second birefringent wedge is optically coupled to a second side of the first birefringent wedge, wherein a second side of the second birefringent wedge is optically coupled to the first side of the at least one focusing lens.

11. The compensator of claim 5, wherein the at least one focusing lens comprises:
    a first focusing lens, wherein a first side of the first focusing lens is optically coupled to the second side of the at least one birefringent wedge and a second side of the first focusing lens is optically coupled to the at least one mirror; and
    a second focusing lens, wherein a first side of the second focusing lens is optically coupled to the second side of the at least one birefringent wedge and a second side of the second focusing lens is optically coupled to the at least one mirror.

12. The compensator of claim 5, wherein the at least one mirror comprises:
    a first mirror optically coupled to the second side of the at least one focusing lens; and
    a second mirror optically coupled to the second side of the at least one focusing lens.

13. The compensator of claim 12, wherein the first mirror reflects a first polarized ray and the second mirror reflects a second polarized ray, wherein a polarization plane orientation of the first and second polarized rays are mutually orthogonal.

14. The compensator of claim 5, wherein the at least one mirror comprises a flat surface.

15. The compensator of claim 5, wherein the at least one mirror comprises a cylindrical concave surface.

16. The compensator of claim 5, wherein the at least one mirror comprises a cylindrical convex surface.

17. The compensator of claim 5, wherein the at least one mirror is adjustable in a vertical direction, wherein a vertical adjustment varies an amount of dispersion added.

18. The compensator of claim 5, wherein the at least one mirror is adjustable in a horizontal direction, wherein a horizontal adjustment varies an amount of dispersion added.

19. The compensator of claim 5, wherein the at least one mirror is rotationally adjustable, wherein a rotational adjustment varies an amount of dispersion added.

20. A dispersion compensator, comprising:
a VIPA optically coupled to an optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and PMD;
a birefringent wedge, wherein a first side of the birefringent wedge is optically coupled to a second side of the VIPA;
a focusing lens, wherein a first side of the focusing lens is optically coupled to a second side of the birefringent wedge;
a first mirror optically coupled to a second side of the focusing lens, wherein the first mirror reflects a first polarized ray of each wavelength of each band of wavelengths toward a return direction; and
a second mirror optically coupled to the second side of the focusing lens, wherein the second mirror reflects a second polarized ray of each wavelength of each band of wavelengths toward a return direction, wherein a polarization plane orientation of the first and second polarized rays are mutually orthogonal, wherein dispersion is added to the reflected first and second polarized rays such that the unwanted chromatic dispersion and PMD are compensated.

21. A dispersion compensator, comprising:
a VIPA optically coupled to an optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and PMD;
a first birefringent wedge, wherein a first side of the first birefringent wedge is optically coupled to a second side of the VIPA;
a second birefringent wedge, wherein a first side of the second birefringent wedge is optically coupled to a second side of the first birefringent wedge;
a first focusing lens, wherein a first side of the first focusing lens is optically coupled to a second side of the second birefringent wedge;
a second focusing lens, wherein a first side of the second focusing lens is optically coupled to the second side of the second birefringent wedge;
a first mirror optically coupled to a second side of the first focusing lens, wherein the first mirror reflects a first polarized ray of each wavelength of each band of wavelengths toward a return direction; and
a second mirror optically coupled to the second side of the second focusing lens, wherein the second mirror reflects a second polarized ray of each of the bands of wavelengths toward a return direction, wherein a polarization plane orientation of the first and second polarized rays are mutually orthogonal, wherein dispersion is added to the reflected first and second polarized rays such that the unwanted chromatic dispersion and PMD are compensated.

22. A system, comprising:
an optical fiber transmission system; and
a dispersion compensator optically coupled to the optical fiber transmission system, the dispersion compensator comprising:
a VIPA optically coupled to the optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and PMD;
at least one birefringent wedge, wherein a first side of the at least one birefringent wedge is optically coupled to a second side of the VIPA;
at least one focusing lens, wherein a first side of the at least one focusing lens is optically coupled to a second side of the at least one birefringent wedge; and
at least one mirror optically coupled to a second side of the at least one focusing lens, wherein the at least one mirror reflects a plurality of polarized rays of each of the bands of wavelengths toward a return direction, wherein dispersion is added to the reflected plurality of polarized rays such that the unwanted chromatic dispersion and PMD are compensated.

23. The system of claim 22, wherein the VIPA separates the wavelengths in a band of wavelengths in each of a plurality of channels, wherein each of the wavelengths in the band is spatially distinguishable from the other wavelengths in the band.

24. The system of claim 22, wherein the at least one birefringent wedge spatially separates each wavelength of each band of wavelengths traversing through the at least one birefringent wedge in the forward direction into the plurality of polarized rays.

25. The system of claim 24, wherein each wavelength is separated into the plurality of polarized rays within a vertical plane.

26. The system of claim 24, wherein each wavelength is separated into the plurality of polarized rays within a horizontal plane.

27. The system of claim 22, wherein the at least one birefringent wedge comprises:
a first birefringent wedge, wherein a first side of the first birefringent wedge is optically coupled to the second side of the VIPA; and
a second birefringent wedge, wherein a first side of the second birefringent wedge is optically coupled to a second side of the first birefringent wedge, wherein a second side of the second birefringent wedge is optically coupled to the first side of the at least one focusing lens.

28. The system of claim 22, wherein the at least one focusing lens comprises:
   a first focusing lens, wherein a first side of the first focusing lens is optically coupled to the second side of the at least one birefringent wedge and a second side of the first focusing lens is optically coupled to the at least one mirror; and
   a second focusing lens, wherein a first side of the second focusing lens is optically coupled to the second side of the at least one birefringent wedge and a second side of the second focusing lens is optically coupled to the at least one mirror.

29. The system of claim 22, wherein the at least one mirror comprises:
   a first mirror optically coupled to the second side of the at least one focusing lens; and
   a second mirror optically coupled to the second side of the at least one focusing lens.

30. The system of claim 29, wherein the first mirror reflects a first polarized ray and the second mirror reflects a second polarized ray, wherein a polarization plane orientation of the first and second polarized rays are mutually orthogonal.

31. The system of claim 22, wherein the at least one mirror comprises a flat surface.

32. The system of claim 22, wherein the at least one mirror comprises a cylindrical concave surface.

33. The system of claim 22, wherein the at least one mirror comprises a cylindrical convex surface.

34. The system of claim 22, wherein the at least one mirror is adjustable in a vertical direction, wherein a vertical adjustment varies an amount of dispersion added.

35. The system of claim 22, wherein the at least one mirror is adjustable in a horizontal direction, wherein a horizontal adjustment varies an amount of dispersion added.

36. The system of claim 22, wherein the at least one mirror is rotationally adjustable, wherein a rotational adjustment varies an amount of dispersion added.

37. A system comprising:
   an optical fiber transmission system;
   an optical circulator, wherein a first port and a third port of the optical circulator are optically coupled to the optical fiber transmission system; and
   a dispersion compensator optically coupled to a second port of the optical circulator, the dispersion compensator comprising:
      a VIPA optically coupled to the optical fiber transmission system at a first side of the VIPA, wherein a composite optical signal from the optical fiber transmission system is capable of traversing through the VIPA in a forward direction, wherein the composite optical signal comprises a plurality of channels, each of the plurality of channels comprising a band of wavelengths, wherein the bands of wavelengths comprise unwanted chromatic dispersion and PMD;
      at least one birefringent wedge, wherein a first side of the at least one birefringent wedge is optically coupled to a second side of the VIPA;
      at least one focusing lens, wherein a first side of the at least one focusing lens is optically coupled to a second side of the at least one birefringent wedge; and
      at least one mirror optically coupled to a second side of the at least one focusing lens, wherein the at least one mirror reflects a plurality of polarized rays of each of the bands of wavelengths toward a return direction, wherein dispersion is added to the reflected plurality of polarized rays such that the unwanted chromatic dispersion and PMD are compensated.

38. A system, comprising:
   a dispersion compensator; and
   a composite optical signal traversing through the dispersion compensator, wherein the composite signal comprises a plurality of channels, each of the plurality of channels comprising a band of wavelengths, wherein the band of wavelengths comprises unwanted chromatic dispersion and PMD,
      wherein the composite optical signal is propagated in a forward direction,
      wherein the wavelengths in the band of wavelengths in each of the plurality of channels are separated utilizing Virtually Imaged Phased Array, wherein each of the wavelengths in the band is spatially distinguishable from the other wavelengths in the band,
      wherein each wavelength of each band of wavelengths is spatially separated into a plurality of polarized rays, and
      wherein the plurality of polarized rays is reflected toward a return direction, wherein dispersion is added to the reflected plurality of polarized rays such that the unwanted chromatic dispersion and PMD are compensated.

39. A system, comprising:
   means for propagating a composite optical signal in a forward direction;
   a Virtually Imaged Phase Array for separating wavelengths in a band of wavelengths in each of a plurality of channels of the composite optical signal, wherein each of the wavelengths in the band is spatially distinguishable from the other wavelengths in the band;
   means for spatially separating each wavelength of each band of wavelengths into a plurality of polarized rays; and
   means for reflecting the plurality of polarized rays toward a return direction, wherein dispersion is added to the reflected plurality of polarized rays such that unwanted chromatic dispersion and PMD are compensated.

* * * * *